United States Patent
Tucker et al.

(10) Patent No.: US 9,597,595 B2
(45) Date of Patent: Mar. 21, 2017

(54) SYSTEMS AND METHODS FOR SEGMENTED COLLECTION MECHANICS

(71) Applicant: Glu Mobile, Inc., San Francisco, CA (US)

(72) Inventors: Spencer Tucker, San Francisco, CA (US); Dennis Sullivan, San Francisco, CA (US)

(73) Assignee: Glu Mobile Inc., San Francisco, CA (US)

( * ) Notice: Subject to any disclaimer, the term of this patent is extended or adjusted under 35 U.S.C. 154(b) by 0 days.

(21) Appl. No.: 14/639,059

(22) Filed: Mar. 4, 2015

(65) Prior Publication Data

US 2016/0256782 A1    Sep. 8, 2016

(51) Int. Cl.
- A63F 9/24 (2006.01)
- A63F 13/00 (2014.01)
- G06F 17/00 (2006.01)
- G06F 19/00 (2011.01)
- A63F 13/58 (2014.01)

(52) U.S. Cl.
CPC .................................... *A63F 13/58* (2014.09)

(58) Field of Classification Search
None
See application file for complete search history.

(56) References Cited

PUBLICATIONS

"Super Mario Bros. 3," Feb. 12, 1990, Nintendo, instruction manual.*
"Super Mario 3D Land," Nov. 13, 2011, Nintendo, instruction manual.*

\* cited by examiner

*Primary Examiner* — Kevin Y Kim
(74) *Attorney, Agent, or Firm* — Morgan, Lewis & Bockius LLP

(57) ABSTRACT

Systems and methods are provided for playing a video game in which a user is associated with a particular gaming level in a plurality of gaming levels and is subjected to one or more challenges in an action format. The user responds to the challenges. The user is provided with a first mechanism for acquiring a first subpart, from among a plurality of subparts, at a time when the user has collected none of the subparts. The subparts collectively define a virtual composite item that has functional value within the game and the subparts do not have functionality within the game until the user has collected the entire plurality of subparts. Subsequently, the user is provided with a second mechanism for acquiring a second subpart from among the plurality of subparts. Use of the virtual composite item is enabled when the user has collected all the subparts.

30 Claims, 15 Drawing Sheets

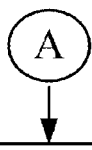

514 Provide the user with a first mechanism for acquiring a first subpart from among a plurality of subparts at a stage in the game in which the user has collected none of the subparts in the plurality of subparts, where the subparts in the plurality of subparts collectively define a virtual composite item that has a value within the game and where the subparts do not have functionality within the game until the user has collected the entire plurality of subparts.

516 Display a plurality of representations, each respective representation in the plurality of representations corresponding to an item in a plurality of items, where each respective item in the plurality of items has a corresponding item characteristic grade in a plurality of item characteristic grades, and where each respective item in the plurality of items is associated with a probability of being awarded that is determined, at least in part, by the characteristic grade of the respective item, and wherein at least one item in the plurality of times is the first subpart; display a cost for the chance, and responsive to the user selecting an affordance that commits the user to paying the cost, awarding the user with a single item from among the plurality of items, wherein the selected single item that is awarded to the user is chosen in accordance with the probability associated with each item in the plurality of items.

518 The cost for the chance is payable through a first form of currency and the user acquires the first form of currency through payment of monetary funds.

520 The cost for the chance is payable through a first form of currency and the user acquires the first form of currency through successful completion of the one or more challenges.

522 The virtual composite item is a weapon, a tool, a potion, a user progression upgrade, a user health status upgrade, or a user power status upgrade.

524 Each subpart in the plurality of subparts is a portion of the blueprints for the making the virtual composite item.

526 The virtual composite item is a defensive base, an offensive base, a weapon, or a car.

FIG. 5B

SYSTEMS AND METHODS FOR SEGMENTED COLLECTION MECHANICS

TECHNICAL FIELD

The present application is generally directed to incentivizing users to play video games using segmented collection mechanics.

BACKGROUND

With the advent of increasingly powerful mobile devices, better connectivity, new generations of gaming consoles, and smart televisions, to name a few recent innovations, the video gaming industry is advancing. Despite these and other technological advances, the challenge remains to game developers to make their respective video games interesting to users so that they may recoup their investment in making such video games. Apart from a captivating story line and action, this challenge is often addressed within video games by a balanced game economy. That is, the game economy is constructed in such a way that it provides a balance between (i) the size of the rewards given to users in exchange for monetary compensation or demonstration of skill and (ii) maintenance of a sufficient level of game difficulty to keep users engaged.

If the awards provided in a video game are too large or distributed too frequently, the game will be deemed too easy to master and user retention will degrade. Moreover, if the awards are too large, the user will not be inclined to spend more money to acquire future awards. If, on the other hand, awards are too small or are not distributed frequently enough, the game will be deemed too difficult to master and user retention will degrade in such situations as well.

Given the above background, new and innovative ways to provide rewards to users in exchange for monetary compensation or skill are needed in the art in order to improve user retention in video games and to improve the return on video game investment.

SUMMARY

The present disclosure addresses the above-identified need in the art by providing new and innovative ways to provide rewards to users in exchange for monetary compensation or demonstration of skill. A durable or semi-durable collection mechanic is invoked in which an item with permanent or obsolescence value is divided into a collection mechanics scheme in which all subparts need to be collected by the user in order to unlock the total potential of the item. For instance, if the item is a car in racing game, the user needs to collect all five blueprints (subparts) to get the car because the individual blueprints provide no value other than being discrete steps toward acquiring the car.

Advantageously, the disclosed innovative collection mechanics scheme allows for the provision, within the game economy, of awards on a more frequent basis. Game users believe they are acquiring something of value, and remain engaged in the video game. Yet the individual subparts, by themselves, have no functional utility and so do not uproot the game economy. The users remain engaged, willing to demonstrate skill by overcoming new challenges, and willing to spend more game currency for the chance to win additional subparts to unlock the total potential of the desired virtual composite item. As such, the disclosed systems and methods enhance the perceived value of virtual composite items and thus provide a mechanism by which game developers can provide game users with something of perceived value without uprooting the game economy and making the game too easy to master.

One aspect of the present disclosure provides systems and methods for playing a video game. In some embodiments the game is formatted so that a user of the game is associated with a particular gaming level in a plurality of gaming levels and is subjected to one or more challenges. As part of game play, the user responds to the challenges. Often, the level of difficulty of such challenges is a function of the gaming level of the user. As some point in the game, the user is provided with a first mechanism for acquiring a first subpart, from among a plurality of subparts, at a time when the user has collected none of the subparts or less than the plurality of subparts. The subparts collectively define a virtual composite item that has functional value within the game. The subparts, individually, do not have functionality within the game until the user has collected all the subparts. Subsequently, after presentation of the first mechanism, the user is provided with a second mechanism for acquiring a second subpart from among the plurality of subparts. This process of subpart acquisition continues until the user has collected all the subparts in the plurality of subparts that is associated with the virtual composite item. Use of the virtual composite item is enabled within the video game when the user has collected all the subparts.

Computing Systems.

Another aspect of the present disclosure provides a computing system (e.g., a handheld computing device, a desktop computing device, a tablet, a smart television, a server, a phone, etc.) for playing a video game. The computing system comprises one or more processors and memory storing one or more programs for execution by the one or more processors. The one or more programs singularly or collectively execute a method in which a user is subjected to one or more challenges in an action format. At least initially, the user is associated with a first gaming level in a plurality of discrete gaming levels associated with the game. Instructions from a user that are responsive to the one or more challenges are received. The user is provided with a first mechanism for acquiring a first subpart, from among a plurality of subparts, at a stage in the game in which the user has collected none of the subparts in the plurality of subparts. The subparts of the plurality of subparts collectively define a virtual composite item that has a value within the game. The subparts do not have functionality within the game until the user has collected the entire plurality of subparts. Once the user has acquired the first subpart, a second mechanism is provided to the user for acquiring a second subpart from among the plurality of subparts. The use of the virtual composite item is enabled when the user has collected the entire plurality of subparts.

In some embodiments, the first mechanism is a chance to acquire the first subpart by displaying a plurality of representations, each respective representation in the plurality of representations corresponding to an item in a plurality of items. Each respective item in the plurality of items has a corresponding item characteristic grade in a plurality of item characteristic grades. Each respective item in the plurality of items is associated with a probability of being awarded that is determined, at least in part, by the characteristic grade of the respective item. At least one item in the plurality of times is the first subpart, and thus the user has a probability, less than unity (e.g., less than a 100 percent chance), of winning the first subpart. Further, a cost of the chance is displayed. Responsive to the user selecting an affordance that commits the user to paying the cost of the chance, the user is awarded with a single item from among the plurality of displayed items. The selected single item that is awarded to the user is chosen in accordance with the probability associated with each item in the plurality of items. In some embodiments, the cost for the chance is payable through a first form of currency. In some embodiments, the user acquires this first form of currency through payment of monetary funds. In some alternative embodiments, the user acquires this first form of currency through successful completion of the one or more challenges (e.g., through demonstrations of game skill).

In some embodiments, each subpart in the plurality of subparts is a portion of the blueprints for making the virtual composite item. In some such embodiments, the virtual composite item is a defensive base, an offensive base, a weapon, or a car.

In some embodiments, each subpart in the plurality of subparts is an ingredient for the making of the virtual composite item. In some such embodiments, the virtual composite item is a magic spell, a potion, a recipe, a bomb, or a medicine.

In some embodiments, upon satisfactory completion of the one or more challenges, the gaming level of the user is advanced from the first gaming level to a second gaming level in the plurality of discrete gaming levels. In some embodiments, the user is not afforded the chance to win second or subsequent subparts of the plurality of subparts until the user has reached the second gaming level.

In some embodiments, the virtual composite item is a weapon, a tool, a potion, a user progression upgrade, a user health status upgrade, or a user power status upgrade.

In some embodiments, the game is characterized by a graph having a plurality of nodes connected by edges in a plurality of edges. Each node in the plurality of nodes is associated with a gaming level in the plurality of discrete gaming levels. Each edge in the plurality of edges represents one or more obstacles (e.g., challenges). Progression from a first node to a second node in the plurality of nodes occurs along a corresponding edge in the graph that links the first and second nodes by user completion of one or more obstacles associated with the corresponding edge. In some such embodiments, the value of the virtual composite item remains constant over the entire directed graph. In some such embodiments, the value of the virtual composite item diminishes upon node advancement.

In some embodiments, the one or more challenges comprises a campaign in which an avatar of the user is posed against a plurality of defendants in a three dimensional action hand-to-hand combat format. In some such embodiments, the avatar and the plurality of defendants are adverse to each other and the avatar has an ability to handle a weapon.

In some embodiments, the one or more challenges comprise a campaign in which an avatar of the user is posed against a plurality of defendants in a three dimensional action shooting format. In some such embodiments, the avatar and the plurality of defendants are adverse to each other and fire weapons at each other and the avatar has an ability to fire a weapon in three dimensions.

Non-Transitory Computer Readable Storage Medium.

Another aspect of the present disclosure provides a non-transitory computer readable storage medium comprising instructions for execution by one or more processors to perform a method of playing a video game. The user is subjected to one or more challenges in an action format. The user is associated, at least initially, with a first gaming level in a plurality of discrete gaming levels associated with the game. Instructions from a user responsive to the one or more challenges are received. The user is provided with a first mechanism for acquiring a first subpart from among a plurality of subparts at a stage in the game in which the user has collected none of the subparts in the plurality of subparts. The subparts in the plurality of subparts collectively define a virtual composite item that has a value within the game. The subparts do not have functionality within the game until the user has collected the entire plurality of subparts. Subsequent to acquisition of the first subpart, the user is provided with a second mechanism for acquiring a second subpart from among the plurality of subparts. The use of the virtual composite item is enabled when the user has collected the entire plurality of subparts.

In some embodiments, the first mechanism is a chance to acquire the first subpart by displaying a plurality of representations, each respective representation in the plurality of representations corresponding to an item in a plurality of items. Each respective item in the plurality of items has a corresponding item characteristic grade in a plurality of item characteristic grades, and each respective item in the plurality of items is associated with a probability of being awarded that is determined, at least in part, by the characteristic grade of the respective item. At least one item in the plurality of times is the first subpart. In accordance with the first mechanism, a cost for the chance is displayed and, responsive to the user selecting an affordance that commits the user to paying the cost, the user is awarded with a single item from among the plurality of items, where the selected single item that is awarded to the user is chosen in accordance with the probability associated with each item in the plurality of items. In some such embodiments, although the user is not told which of the items the user will win, the user is guaranteed that the item awarded will have a minimum value.

In some embodiments, each subpart in the plurality of subparts is a portion of the blueprints for the making the virtual composite item. In some embodiments, the virtual composite item is a defensive base, an offensive base, a weapon, or a car. In some embodiments, each subpart in the plurality of subparts is an ingredient for the making the virtual composite item. In some such embodiments, the virtual composite item is a magic spell, a potion, a recipe, a bomb, or a medicine.

In some embodiments, upon satisfactory completion of the one or more challenges, the gaming level of the user is advanced from the first gaming level to a second gaming level in the plurality of discrete gaming levels. In some embodiments, the second mechanism for providing the second subpart is provided contingent upon the user reaching the second gaming level.

In some embodiments, the virtual composite item is a weapon, a tool, a potion, a user progression upgrade, a user health status upgrade, or a user power status upgrade.

In some embodiments, the game is characterized by a graph having a plurality of nodes connected by edges in a plurality of edges. Each node in the plurality of nodes is associated with a gaming level in the plurality of discrete gaming levels. Each edge in the plurality of edges represents one or more obstacles. Progression from a first node to a second node in the plurality of nodes occurs along a corresponding edge in the graph that links the first and second nodes by user completion of one or more challenges associated with the corresponding edge. In some embodiments, the value of the virtual composite item remains constant upon progression from node to node in the directed graph. In other words, the virtual composite item has permanent or semi-permanent value in such embodiments. In some embodiments, the value of the virtual composite item diminishes upon progression from node to node in the directed graph. In other words, the virtual composite item has obsolescence value in such embodiments.

Methods.

Another aspect of the present disclosure provides a method for playing a video game in which a user is subjected to one or more challenges in an action format, where the user is associated, at least initially, with a first gaming level in a plurality of discrete gaming levels associated with the game. Instructions from a user responsive to the one or more challenges are received. The user is provided with a first mechanism for acquiring a first subpart from among a plurality of subparts at a stage in the game in which the user has collected none of the subparts in the plurality of subparts. The subparts in the plurality of subparts collectively define a virtual composite item that has a value within the game. The subparts do not have functionality within the game until the user has collected the entire plurality of subparts. At a time after the user has acquired the first subpart, the user is provided with a second mechanism for acquiring a second subpart from among the plurality of subparts. Use of the virtual composite item is enabled when the user has collected the entire plurality of subparts.

In some embodiments, the game is characterized by a graph having a plurality of nodes connected by edges in a plurality of edges. Each node in the plurality of nodes is associated with a gaming level in the plurality of discrete gaming levels. Each edge in the plurality of edges represents one or more challenges. Progression from a first node to a second node in the plurality of nodes occurs along a corresponding edge in the graph that links the first and second nodes by user completion of one or more obstacles associated with the corresponding edge. In some embodiments, the value of the virtual composite item remains constant upon progression from node to node in the directed graph. In some embodiments, the value of the virtual composite item diminishes upon progression from node to node in the directed graph.

BRIEF DESCRIPTION OF THE DRAWINGS

The implementations disclosed herein are illustrated by way of example, and not by way of limitation, in the figures of the accompanying drawings. Like reference numerals refer to corresponding parts throughout the drawings.

FIGS. 5A, 5B, and 5C provide another example flow chart illustrating a method for playing a video game, in accordance with some implementations of the present disclosure.

Like reference numerals refer to corresponding parts throughout the drawings.

DESCRIPTION OF IMPLEMENTATIONS

Disclosed are systems and methods for playing a video game in which a user is associated with a particular gaming level in a plurality of gaming levels and is subjected to one or more challenges in an action format. The user responds to the challenges. The user is provided with a first mechanism for acquiring a first subpart, from among a plurality of subparts, at a time when the user has collected none of the subparts. The subparts collectively define a virtual composite item that has functional value within the game once the user has collected all the subparts. The subparts do not have functionality within the game until the user has collected the entire plurality of subparts. At some point the user is provided with a second mechanism for acquiring a second subpart from among the plurality of subparts. Such mechanisms are afforded to the user until the user has acquired all of the subparts associated with a virtual composite item. Use of the virtual composite item is enabled when the user has collected all the subparts.

Additional details of implementations are now described in relation to the Figures.

Figure 1:
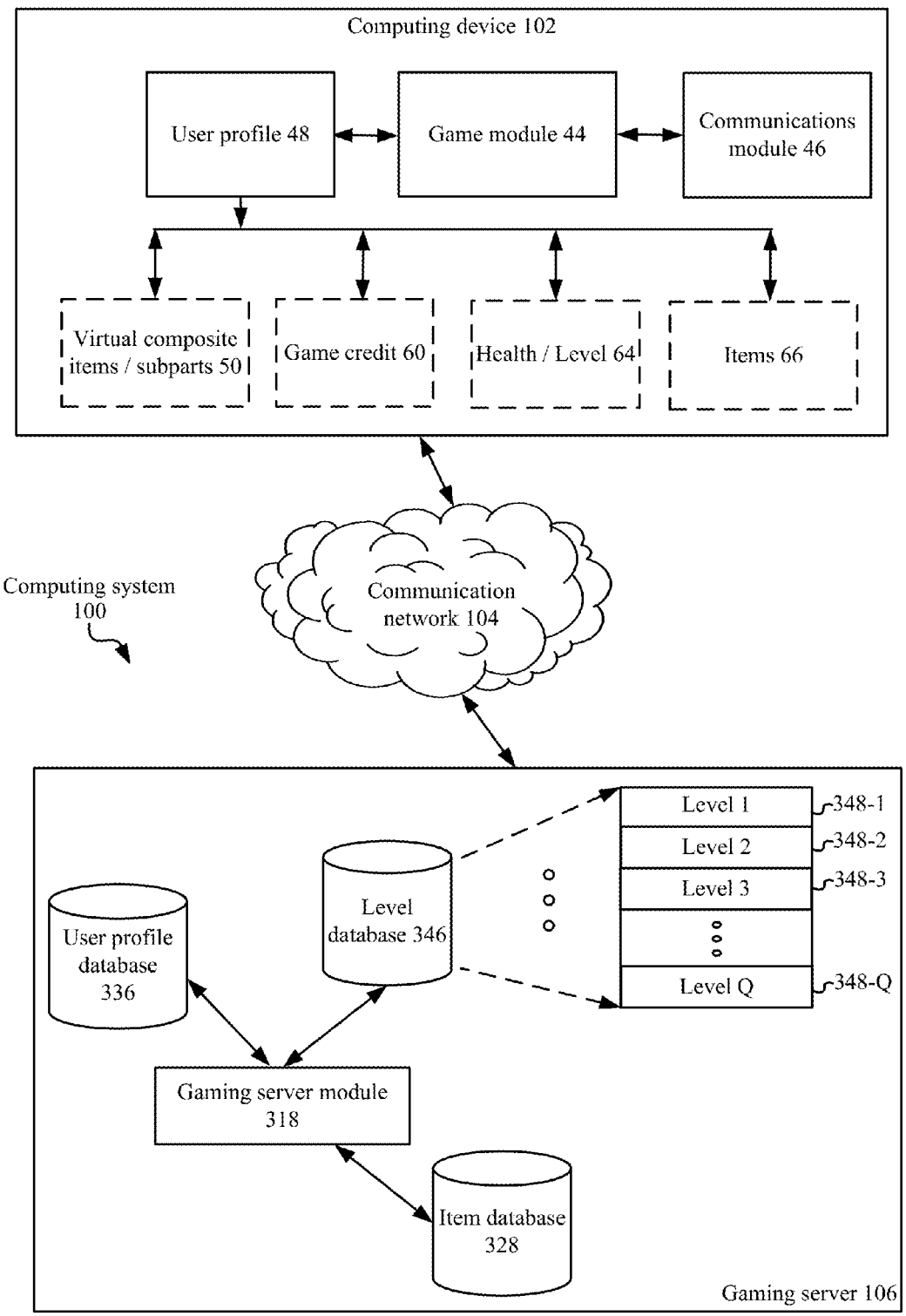
FIG. 1 is an example block diagram illustrating a computing system, in accordance with some implementations of the present disclosure.

FIG. 1 is a block diagram illustrating a computing system 100, in accordance with some implementations. In some implementations, the computing system 100 includes one or more computing devices 102 (e.g., computing devices 102A, 102B, 102C, 102D . . . , and 102N), a communication network 104, and one or more gaming server systems 106. In some implementations, a computing device 102 is a phone (mobile or landline, smart phone or otherwise), a tablet, a computer (mobile or otherwise), or a hands free computing device.

In some implementations, a computing device 102 is used by a video game to subject the user to one or more challenges in an action format. As an example of such a challenge, in some embodiments, an avatar of the user is posed against multiple defendants of a base not associated with the user. For instance, the base may be associated with another user. The user infiltrates the opposing base in a three dimensional action shooting format in which the avatar and the base defendants are adverse to each other and fire weapons at each other. Advantageously, the avatar has an ability to fire a weapon in three dimensions, and explore the base in three dimensions, during such campaigns. Here, the one or more challenges comprise infiltrating the base by compromising the base defendants. Continuing with this example, instructions from the user responsive to the one or more challenges are received. In the instant example, these instructions comprise instructions on where to position the avatar within the video game environment, weapon selection, and weapon usage instructions. In typical embodiments, successful completion of the one or more challenges (e.g., in the instant example, termination of the base defendants and infiltration of the base) leads to the award of game credit to the user. The user has the option to use such game credit to buy better items (e.g., weapons) or upgrade existing items. The acquisition of new items, or the improvement in characteristics of items already in possession, allows the user to infiltrate enemy bases with greater ease.

In accordance with the present disclosure, the user is provided with a first mechanism for acquiring a first subpart from among a plurality of subparts at a stage in the game in which the user has collected none of the subparts in the plurality of subparts. The subparts in the plurality of subparts collectively define a virtual composite item that has a value within the game. For instance, in some embodiments, the virtual composite item is a complete set of blueprints for a base or a weapon. In the present disclosure, the subparts do not have functionality within the game until the user has collected the entire plurality of subparts. For instance, in the case where the subparts are component blueprints, the user does not have access to the subject of the blueprints (e.g., weapon, base, etc.) until the user has collected the complete set of blueprints.

Subsequent to acquisition of the first subpart, the user is provided with a second mechanism for acquiring a second subpart from among the plurality of subparts. In this way, the user collects each of the subparts in the plurality of subparts in order to gain access to the virtual composite item uniquely represented by the plurality of subparts. In some embodiments, the plurality of subparts consists of two subparts and the user must obtain both subparts in order to gain access to the virtual composite item associated with the subparts. In some embodiments, the plurality of subparts consists of three subparts and the user must obtain all three subparts in order to gain access to the virtual composite item associated with the subparts. In some embodiments, the plurality of subparts consists of four subparts and the user must obtain all four subparts in order to gain access to the virtual composite item associated with the subparts. In some embodiments, the plurality of subparts comprises five or more subparts and the user must obtain all of the five or more subparts in order to gain access to the virtual composite item associated with the subparts.

When the user selects an item, or an item upgrade (e.g., a base upgrade), the associated cost of the transaction is deducted from the user's game credit.

In some implementations, the computing device 102 includes a game module 44 that facilitates the above identified actions. In some implementations, the computing device 102 also includes a user profile 48. The user profile 48 stores characteristics of the user such as which subparts of the plurality of subparts of virtual composite items 50 the user has acquired, game credit 60 that the user has acquired, the health of the user and the level 64 that the user has acquired through successful completion of one or more challenges, and optionally the items (e.g., weapons) 66 that the user has acquired. In some embodiments, the virtual composite items/subparts 50 are stored as items 66, and the subparts are listed as item characteristics.

In some implementations, the computing device 102 also includes a communications module 46. The communications module 46 is used to communicate with gaming server 106, for instance, to face additional challenges, shop for additional items, shop for item upgrades, review game credit, or report game credit.

In some implementations, the communication network 104 interconnects one or more computing devices 102 with each other, and with the gaming server system 106. In some implementations, the communication network 104 optionally includes the Internet, one or more local area networks (LANs), one or more wide area networks (WANs), other types of networks, or a combination of such networks.

In some implementations, the gaming server system 106 includes a gaming server module 318, a user profile database 336, a level database 346 comprising a plurality of levels 348, and an item database 328. In some embodiments, the gaming server module 318, through the game module 44, provides players (users) with one or more challenges in the form of levels 348. In some embodiments each level 348 includes one or more challenges and the user can select from among these challenges. For instance, in the example where the game is a racing game, a given level 348 may have multiple racing circuits. The completion of any one of these racing circuits represents a challenge in such embodiments. In some embodiments, as the user advances through levels, the challenges in each level become more difficult. In the car racing example, the racing circuits become more difficult to complete on a competitive basis. In the base infiltration video game example described above, a level 348 challenges a user to infiltrate a base.

In some embodiments, as a user successfully completes the one or more challenges of a certain level 348, their skill level advances, they acquire game credit, and/or they advance to more difficult levels 348.

In some embodiments, a user is provided with, obtains, purchases, or otherwise acquires one or more items, such as weapons, cars, etc. to use in the video game to address challenges. In some embodiments, a user purchases item upgrades or new items altogether. In some embodiments, a user may not purchase such item upgrades or new items but, rather, acquires such upgrades and new items by earning game credit through the successful completion of one or more challenges of levels of the game. In some embodiments, the user may earn game credit by purchase or by successful completion of one or more challenges. In some embodiments, there are two or more currencies in a game, and the identity of each such currency is determined by the currency acquisition means. For instance, in some embodiments, there are two forms of currency, one which is purchased using cash and one which is acquired by successfully addressing challenges.

In some embodiments, the gaming server module 318 provides users with an interface for acquiring item upgrades or new items. In some embodiments, the gaming server module 318 uses the item database 328 to track which items, which item upgrades, and which item characteristics are supported by the game. In some embodiments, the item database 328 provides categories of items and the user first selects an item category and then an item in the selected item category. In one example, the items are weapons and exemplary weapons categories include, but are not limited to, assault rifles, sniper rifles, shotguns, Tesla rifles, grenades, and knife-packs.

In some embodiments, users are ranked into tiers based on the most difficult level 348 they have completed. In one example, tier 1 is a beginner level whereas tier 10 represents the most advanced level. That is, there is a one-to-one correspondence between tier and level, in such an example. Users begin at an initial tier (e.g., tier 1) and as they successfully complete levels 348 their tier level advances (e.g., to tier 2 and so forth). In some embodiments, there is a many-to-one relationship between levels and tiers. In such embodiments, the user must successfully complete several levels before advancing by a tier. In some embodiments, the items available to a player in each items category in item database 328 are dependent upon their tier level. In this way, as the user advances to more advanced tiers, more advanced items are unlocked in items database 328 and thus made available to the user. For example, in a game in which the items include weapons, in the assault rifles category, at the tier 1 level, item database 328 provides a Commando XM-7, a Raptor Mar-21, and a Viper X-72. In some embodiments, in the sniper rifles category, at the tier 1 level, weapon item 328 provides a Scout M390, a Talon SR-9, and a Ranger 338LM. In some embodiments, in the shotguns category, at the tier 1 level, item database 328 provides a SWAT 1200, a Tactical 871, and a Defender. In some embodiments, in the Tesla rifles category, at the tier 1 level, item database 328 provides an M-25 Terminator, a Tesla Rifle 2, and a Tesla Rifle 3. In some embodiments, item database 328 further provides grenades (e.g., frag grenades for damaging groups of enemies crowded together and flushing out enemies hiding behind doors or corners) and knife-packs. In some such embodiments, the characteristics of these items are tiered. For example, in some embodiments, the accuracy of a weapon may be upgraded to a certain point, the point being determined by the user's tier level. In some embodiments, the terms "tier", "level" and "tier level" are interchangeable.

In some embodiments, gaming server module 318 maintains a profile in the user profile database 336 of each user playing the game on a computing device 102. In some embodiments, there are hundreds, thousands, tens of thousands or more users playing instances of the game on corresponding computing devices 102 and a gaming server module 318 stores a profile for each such user in user profile database 336. In some embodiments, the user profile database 336 does not store an actual identity of such users, but rather a simple login and password. In some embodiments, the profiles in the user profile database 336 are limited to the logins and passwords of users. In some embodiments, the profiles in user profile database 336 are limited to the logins, passwords, and the levels of users. In some embodiments, the profiles in user profile database store more information about each user, such as amounts (and types) of game credit, types of items owned, characteristics of such items, and which subparts of which virtual composite items the user has acquired. In some embodiments, the user profile in the user profile database 336 includes a limited amount of information whereas a user profile 48 on a computing device 102 associated with the user contains more information. For example, in some embodiments, the user profile in user profile database 336 includes user login and password and game credit acquired whereas the user profile 48 on the computing device 102 for the same user includes information on items owned by the user, and the characteristics of such items. It will be appreciated that any possible variation of this is possible, with the profile for the user in user profile database 336 including all or any subset of the data associated with the user and the user profile 48 for the user on the corresponding computing device 102 including all or any subset of the data associated with the user. In some embodiments, there is no user profile 48 stored on computing device 102 and the only profile for the user is stored on gaming server 106 in user profile database 336.

Figure 2:
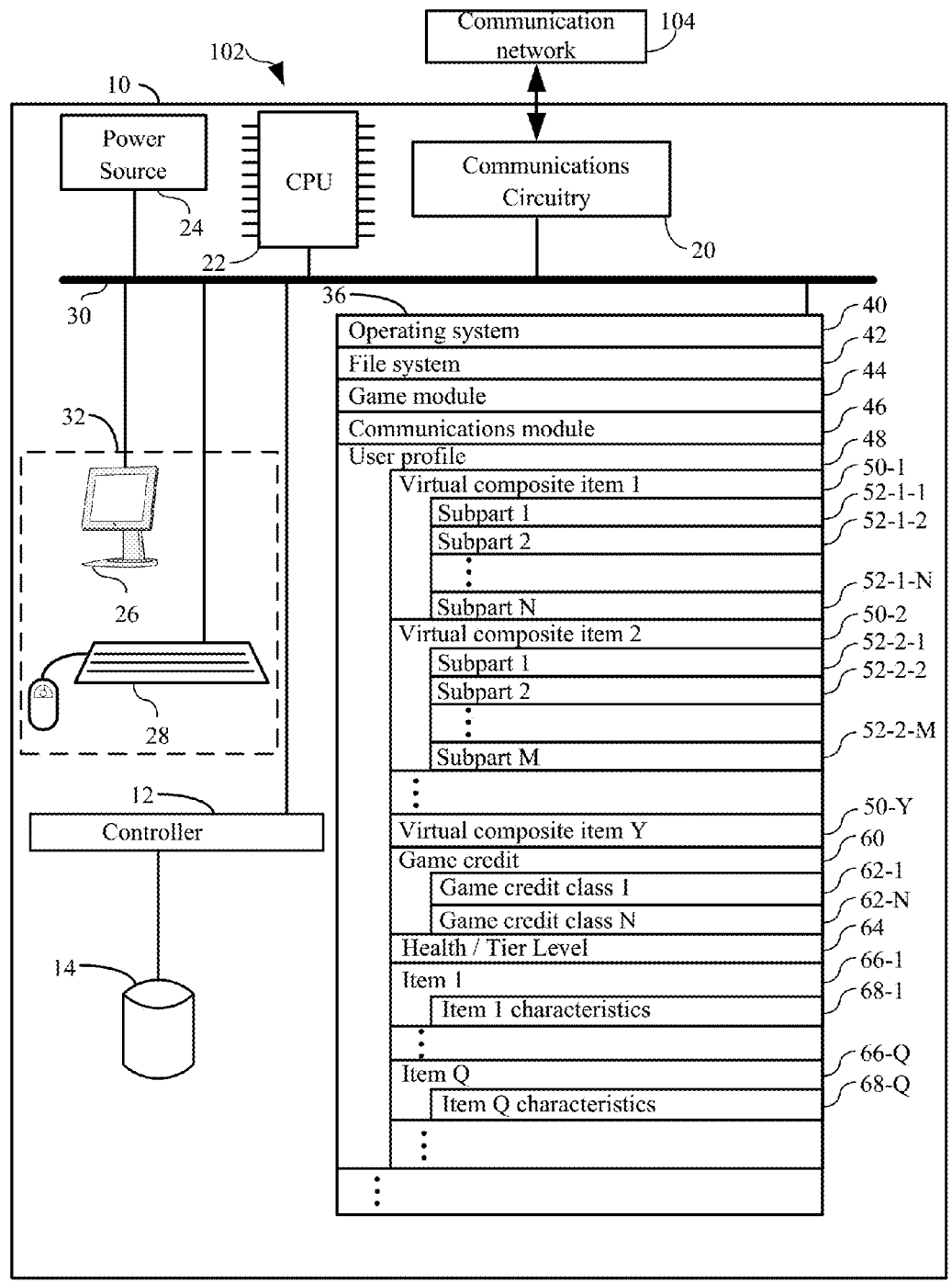
FIG. 2 is an example block diagram illustrating a client computing device, in accordance with some implementations of the present disclosure.

FIG. 2 is an example block diagram illustrating a computing device 102, in accordance with some implementations of the present disclosure. The computing device 102 in some implementations includes one or more processing units CPU(s) 22 (also referred to as processors), one or more network interfaces 20, a user interface 32, a memory 36, and one or more communication buses 30 for interconnecting these components and one or more power sources 24 for powering these components. The communication buses 30 optionally include circuitry (sometimes called a chipset) that interconnects and controls communications between system components. The memory 36 typically includes high-speed random access memory, such as DRAM, SRAM, DDR RAM or other random access solid state memory devices, and optionally includes non-volatile memory 14, such as one or more magnetic disk storage devices, flash memory devices, or other non-volatile solid state storage devices optionally accessed by a controller 12. The memory 36 optionally includes one or more storage devices remotely located from the CPU(s) 22. The memory 36, or alternatively the non-volatile memory device(s) within the memory 36, comprises a non-transitory computer readable storage medium. In some implementations, the memory 36 or alternatively the non-transitory computer readable storage medium stores the following programs, modules and data structures, or a subset thereof:
- optionally, an operating system 40, which includes procedures for handling various basic system services and for performing hardware dependent tasks;
- optionally, a file system 42 which may be a component of operating system 40, for managing files stored or accessed by the computing device 102;
- a game module 44 for subjecting a user to one or more challenges in an action format;
- a communications module (or instructions) 46 for connecting the device 102 with other devices (e.g., the gaming server 106 and the devices 102B . . . 102N) via one or more network interfaces 20 (wired or wireless), and/or the communication network 104 (FIG. 1);
- a user profile 48 for tracking the aspects of the user, the user profile 48 including:
  - one or more virtual composite items 50 associated with the user, including, for each respective virtual composite items 50, each respective virtual composite item, which subparts 52 the user has acquired;
  - an accounting of game credit 60, the game credit 60 optionally consisting of more than one class, such as a first game credit class through an $N^{th}$ game credit class 62, where N is a positive integer greater than one;
  - a health and/or tier level of the user 64; and
  - one or more items 66 obtained by the user, and for each such item, the characteristics of the item (e.g., in the case of a weapon, armed guard firing rate, armed guard firepower, armed guard reload rate, etc. in the case of a car, make, model, color, engine size, etc.).

In some implementations, the user interface 32 includes an input device (e.g., a mouse or keyboard 28) for a user to interact with the computing device 102.

In some implementations, one or more of the above identified elements are stored in one or more of the previously mentioned memory devices, and correspond to a set of instructions for performing a function described above. The above identified modules or programs (e.g., sets of instructions) need not be implemented as separate software programs, procedures or modules, and thus various subsets of these modules may be combined or otherwise re-arranged in various implementations. In some implementations, the memory 36 optionally stores a subset of the modules and data structures identified above. Furthermore, the memory 36 may store additional modules and data structures not described above.

Figure 3:
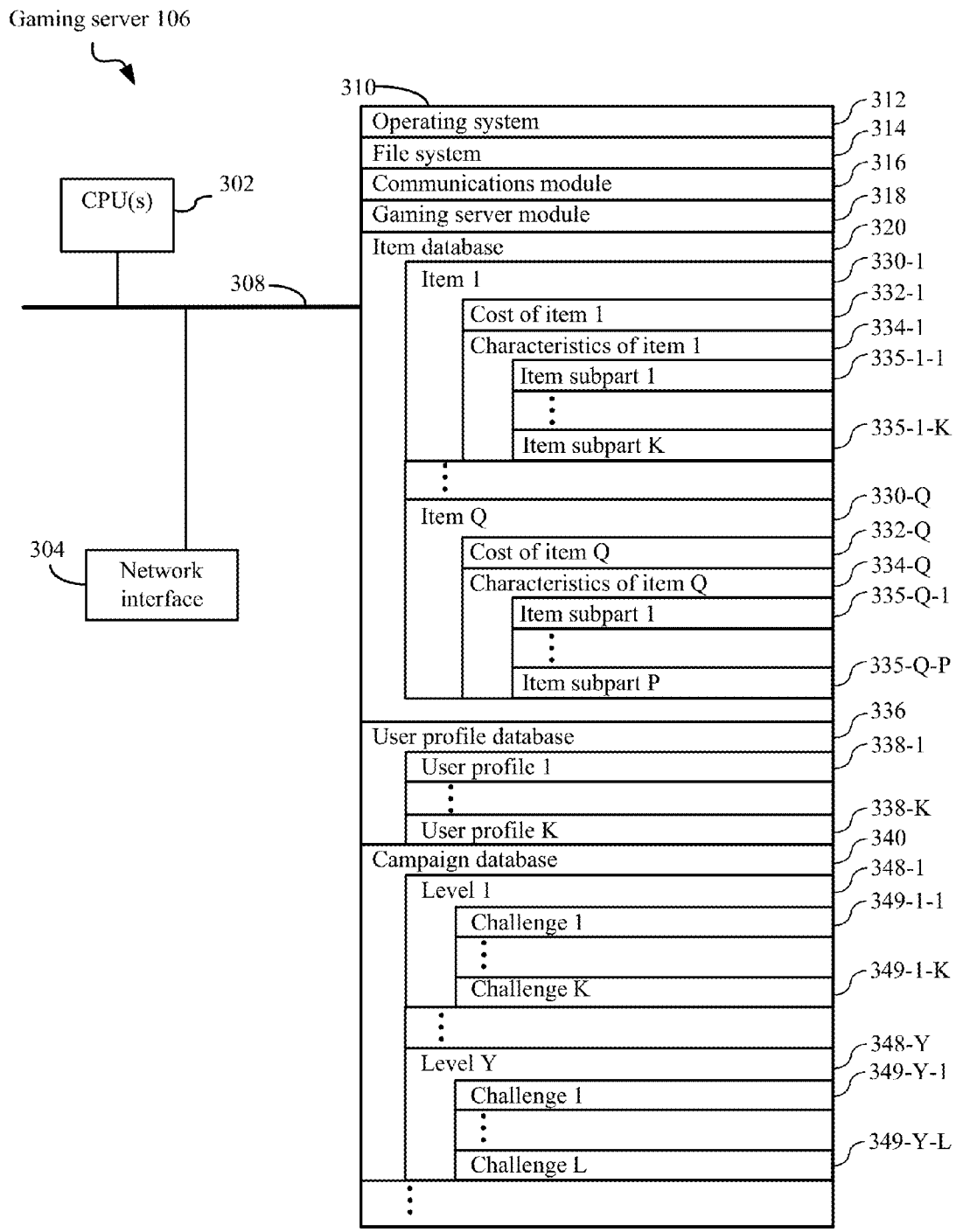
FIG. 3 is an example block diagram illustrating a gaming server, in accordance with some implementations of the present disclosure.

FIG. 3 is an example block diagram illustrating a gaming server 106 in accordance with some implementations of the present disclosure. The gaming server 106 typically includes one or more processing units CPU(s) 302 (also referred to as processors), one or more network interfaces 304, memory 310, and one or more communication buses 308 for interconnecting these components. The communication buses 308 optionally include circuitry (sometimes called a chipset) that interconnects and controls communications between system components. The memory 310 includes high-speed random access memory, such as DRAM, SRAM, DDR RAM or other random access solid state memory devices and optionally includes non-volatile memory, such as one or more magnetic disk storage devices, optical disk storage devices, flash memory devices, or other non-volatile solid state storage devices. The memory 310 optionally includes one or more storage devices remotely located from CPU(s) 302. The memory 310, or alternatively the non-volatile memory device(s) within the memory 310, comprises a non-transitory computer readable storage medium. In some implementations, the memory 310 or alternatively the non-transitory computer readable storage medium stores the following programs, modules and data structures, or a subset thereof:

- an operating system 312, which includes procedures for handling various basic system services and for performing hardware dependent tasks;
- optionally, a file system 314 which may be a component of operating system 312, for managing files stored or accessed by the gaming server 106;
- a network communication module (or instructions) 316 for connecting the server 106 with other devices (e.g., the computing devices 102) via the one or more network interfaces 304 (wired or wireless), or the communication network 104 (FIG. 1);
- a gaming server module 318 for managing a plurality of instances of games, each instance corresponding to a different user and each instance supporting a number of levels, and for tracking user activities within such games;
- an item database 328 to track the items 330 that are supported by the game as well as the costs 332 of such items and the characteristics 334 of such items, including, in instances where such items 330 are virtual composite items, the subparts 335 of such items;
- a user profile database 336 that stores a user profile 338 for each user of the game;
- a level database 346 for storing the levels 348 that may be offered to the gaming server module 318, and for each respective level 348, the one or more challenges 349 associated with the respective level.

In some implementations, one or more of the above identified elements are stored in one or more of the previously mentioned memory devices, and correspond to a set of instructions for performing a function described above. The above identified modules or programs (e.g., sets of instructions) need not be implemented as separate software programs, procedures or modules, and thus various subsets of these modules may be combined or otherwise re-arranged in various implementations. In some implementations, the memory 310 optionally stores a subset of the modules and data structures identified above. Furthermore, the memory 310 may store additional modules and data structures not described above. Further, it will be appreciated that both non-composite items (e.g., referred to as items 66 in FIG. 2) and virtual composite items (e.g., referred to as virtual composite items 50 in FIG. 2). In some embodiments, non-composite items and virtual composite items are stored separately. In some embodiments, non-composite items stored in item database 320 do not include item subparts 335 whereas virtual composite items do include such subparts. One of skill in the art will appreciate that there are any number of ways to track and store information about non-composite items and composite items and all such ways are within the scope of the present disclosure.

Although FIGS. 2 and 3 show a "computing device 102" and a "gaming server 106," respectively, FIGS. 2 and 3 are intended more as functional description of the various features which may be present in computer systems than as a structural schematic of the implementations described herein. In practice, and as recognized by those of ordinary skill in the art, items shown separately could be combined and some items could be separated.

Figure 4:
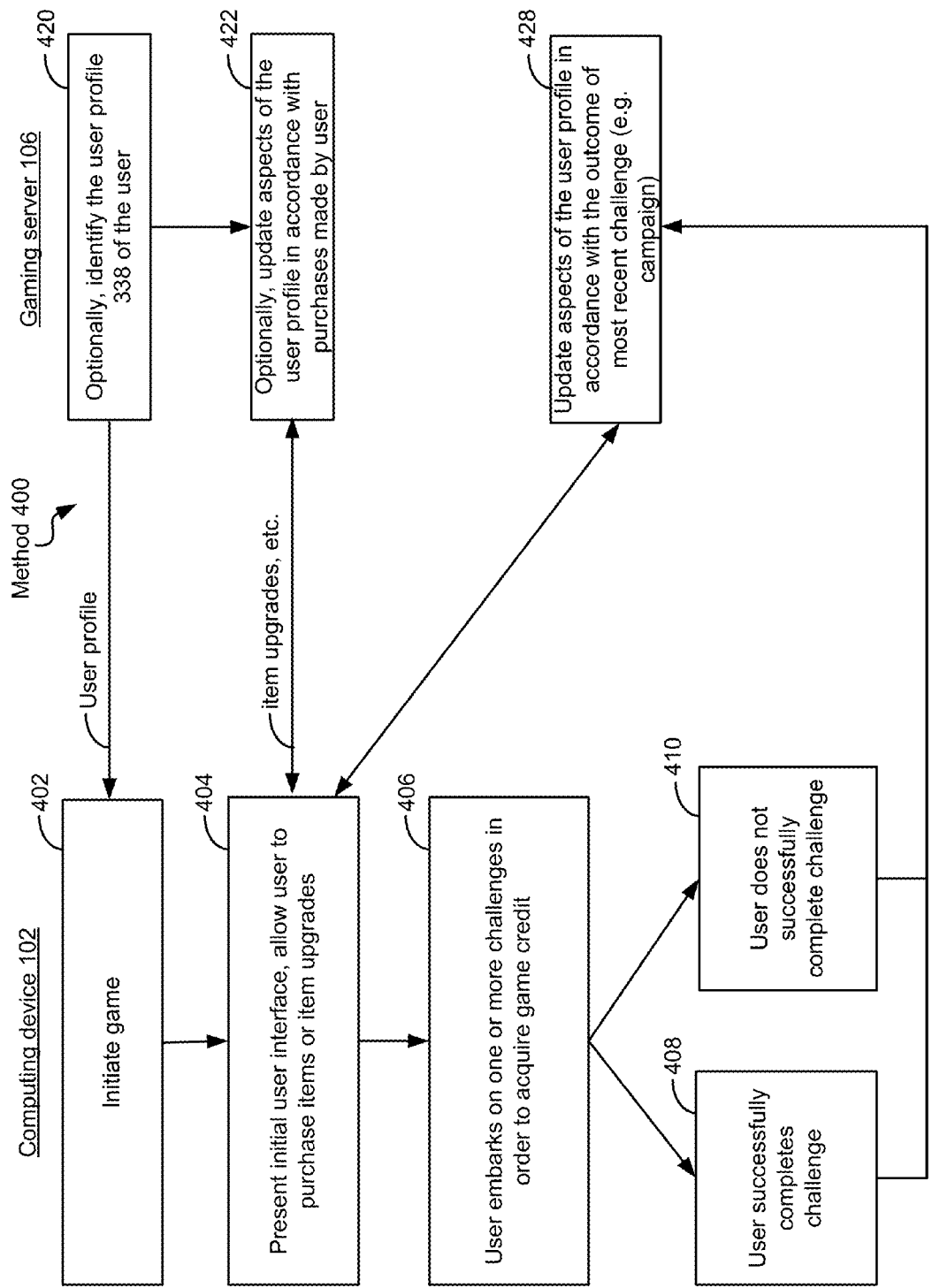
FIG. 4 is an example flow chart illustrating a method for playing a video game, in accordance with some implementations of the present disclosure.

FIG. 4 is a flow chart illustrating a method for playing a video game, e.g., using a computing device 102 and/or gaming server 106, in accordance with some implementations.

In some implementations, a user initiates 402, at the computing device 102, an instruction to start the game using the computing device 102A. In response, the gaming server 106 obtains the user profile 338 associated with the user who just initiated the game. In some alternative embodiments (not shown), some or all of the components of the user profile is actually obtained from the user profile 48 stored locally on the device 102 rather than obtaining a profile of the user from the server. In still other embodiments, some components of the user profile are obtained from the user profile 48 of the device 102 whereas other components of the user profile are obtained from the user profile 338 on the server. In some embodiments, a gaming server 106 is not used and all the functionality shown for gaming server 106 is in fact resident on the computing device 102.

Figure 6:
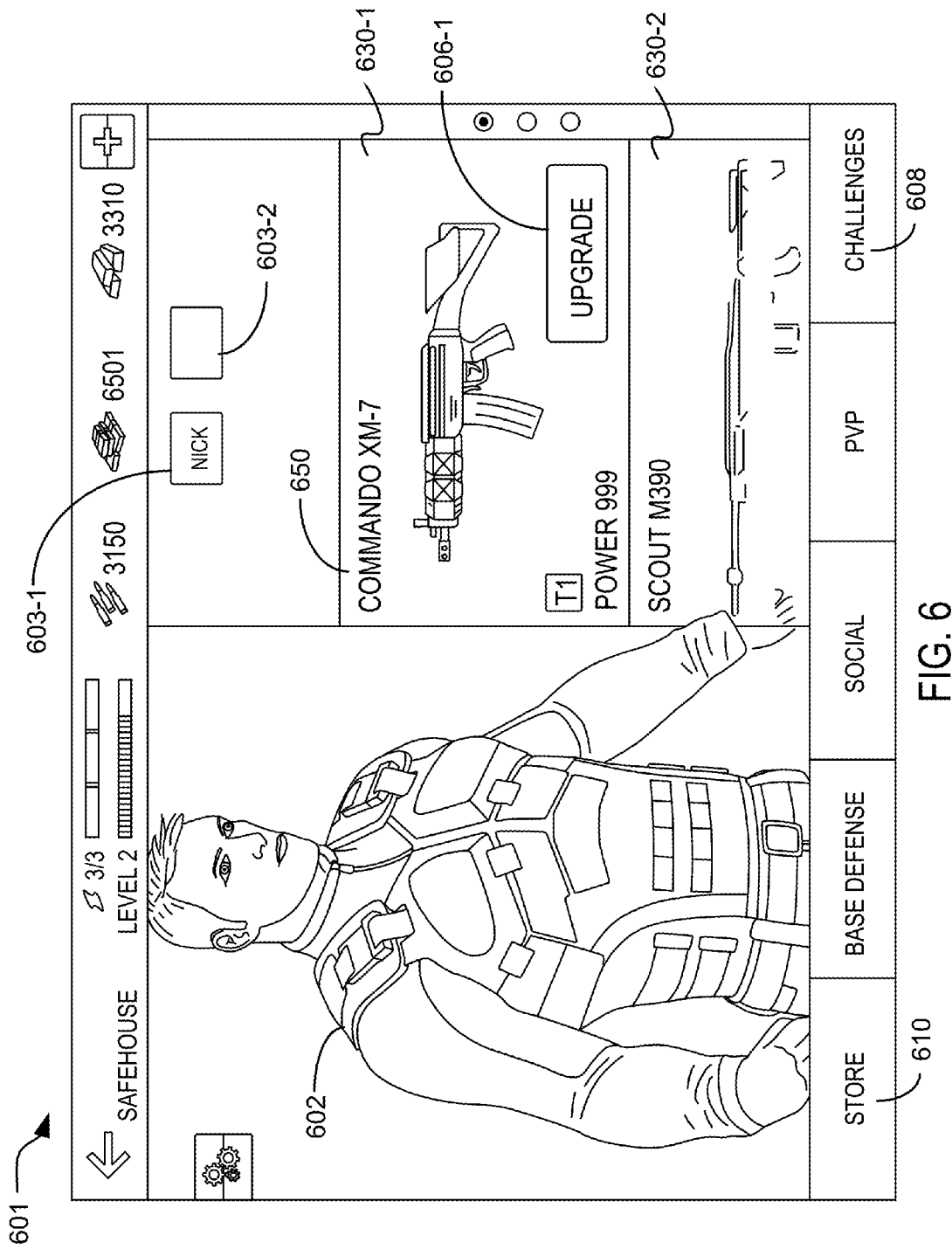
FIG. 6 is a screen image showing an example initial interface of a video game, in accordance with an embodiment of the present disclosure.

FIG. 6 provides a screen shot of an example initial interface 601 that is presented to the user via computing device 102 when the user has initiated the game. Referring to FIG. 6, an avatar 602 of the user is depicted. In some embodiments, the user is able to customize characteristics of the avatar 602 and these customizations are stored in the user profile of the user on computing device 102 and/or gaming server 106. In some embodiments the name of the user is displayed 603. When the user selects the name, the user is able designate a title for the name. As illustrated in interface 601 of FIG. 6, in some embodiments, multiple names 603 can be associated with a user and, for each such name, a title can be designated. Each such name and title is stored in the user profile. In some embodiments, only a single name 603 can be associated with a user and this name title is stored in the user profile.

Figure 7:
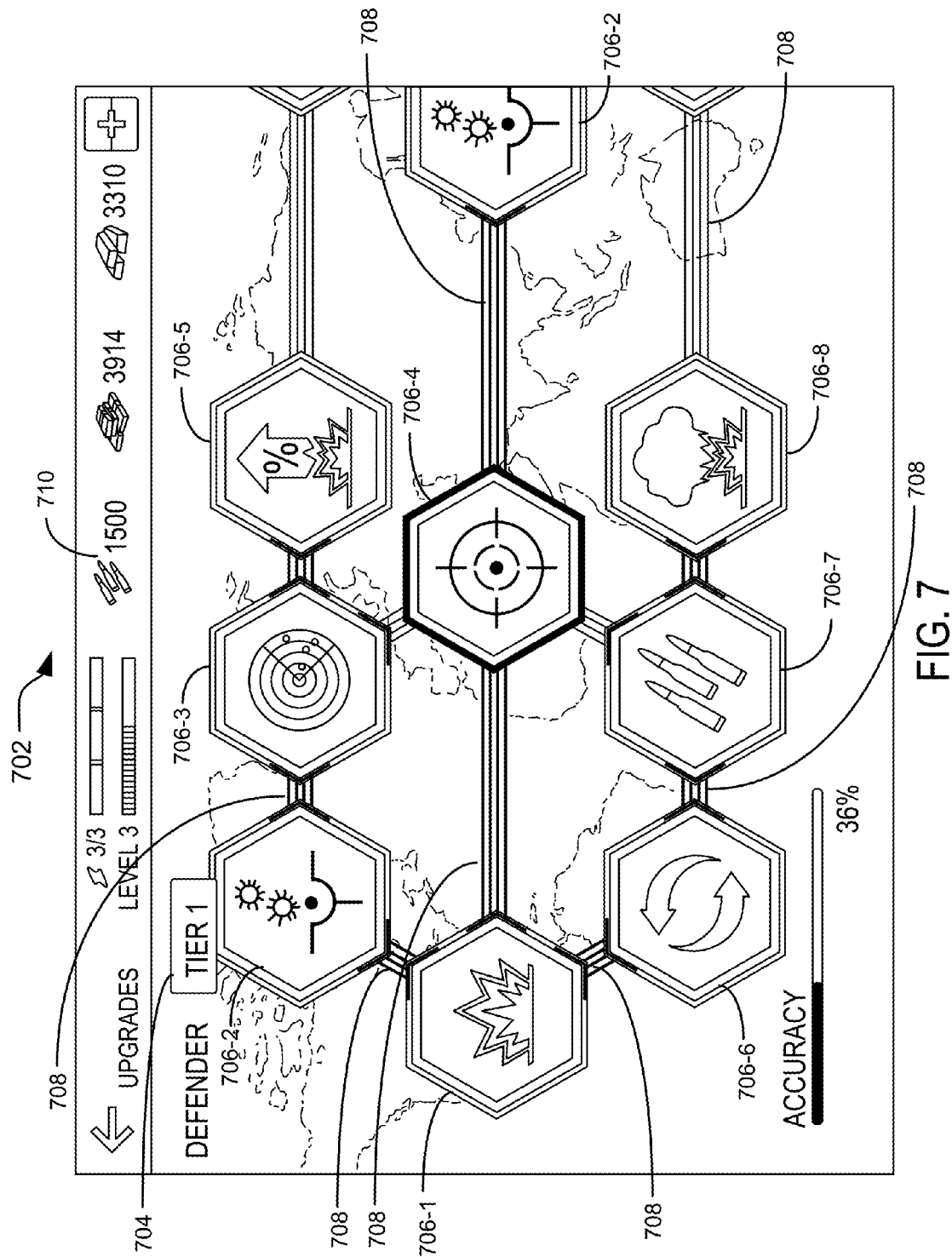
FIGS. 7 and 8 are screen images showing the item upgrades available for corresponding items, in accordance with an embodiment of the present disclosure.
Figure 8:
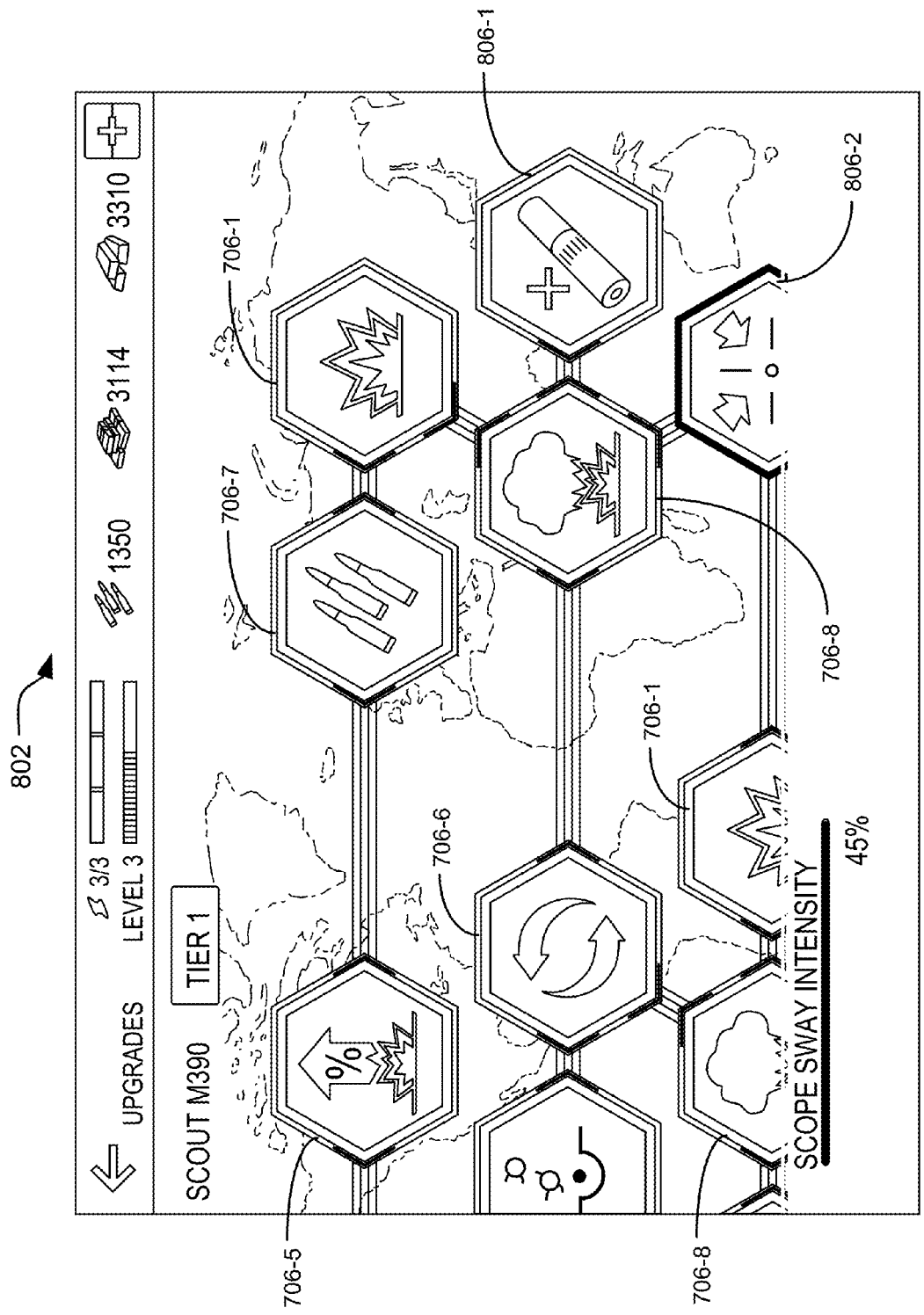

In the exemplary video game illustrated in FIG. 6, the user objective is to accumulate game credit by infiltrating enemy bases. As such, in this example, the base infiltrating constitutes the one or more challenges the user is subjected to in an action format. In the exemplary video game, the user's avatar 602 is challenged to infiltrate a base and compromise a base target. In some embodiments, the base target is a henchman in a particular room within the base. To compromise the base target the user must get through the base defenses. These base defenses include guards that are adverse to the user and fire weapons at the user's avatar when the avatar is discovered by the defendants in the base. To ward off and neutralize these defenses the user selects a weapon 630, which is one form of item 66. For instance, referring to FIG. 6, in the initial user interface, the default weapon for the illustrated user is a Commando XM-7 (650). Base infiltration is not an easy task, it requires skill on the part of the user as well as good weapons/items. Accordingly, the user can upgrade the weapon through toggle 606 of example initial interface 601 in exchange for game credit 60. When the user selects to upgrade an item (e.g., weapon) through toggle 606, a menu such as that illustrated in FIGS. 7 and 8 are illustrated. FIG. 7 illustrates the weapon characteristics upgrades 702 that are possible for one selected weapon, the Defender. FIG. 8 illustrates the weapon characteristics upgrades that are possible for another selected weapon, the Scout M390. In some embodiments, some of the weapon characteristics upgrades are locked until the user advances to a higher level. As illustrated in FIG. 7, the user's level 704 is presently "tier 1", the lowest, or initial tier. As such, in some embodiments of the present disclosure, some weapon characteristics upgrades are not available or are locked even though the user may have sufficient game credit. In panel 702, icon 706-1 represents damage—the amount of damage a weapon will inflict when it hits a target. In some embodiments, damage is rated on a numeric scale, such as 1 to 24, with higher numbers representing more significant damage, and the user is able to exchange game credit, illustrated as icons 708-1 and 708-2 of panel 702 of FIG. 7, for a larger number on this scale. Referring to FIG. 2, in some embodiments, the fact that a user possesses a particular item (e.g. weapon) is stored as element 66 in the user profile 48 when the item is a non-composite item and is stored as an element 50 when the weapon is a virtual composite item, and the item characteristics, such as the damage number in the case of a weapon, is stored as an item characteristic 68. Thus, in referring to FIG. 2, it will be appreciated that virtual composite items 50 may include characteristics in addition to subparts. For instance, a virtual composite item 50 may include any of the characteristics 68 of a non-composite item 66. In fact, in some embodiments, items 66 and virtual composite items 50 are stored in the same format in some embodiments, with the subparts 52 of the virtual composite items 50 being considered characteristics 68.

Continuing to refer to panel 702 of FIG. 7, other characteristics of an item that are numerically ranked and individually stored as item characteristics 68 in accordance with some embodiments of the present disclosure include recoil power 706-2, range 706-3, accuracy 706-4, critical hit chance 706-5, reload time 706-6, ammunition clip size 706-7, and critical damage multiplier 706-8, in the case where such items 66 are weapons. In instances where the items are other than weapons, such as magic spells, the characteristics of such items are descriptive of such items. For instance, in the case of a magic spell, the characteristics may include the power of the spell, the range of the spell, and optionally the subparts of the spell (when the spell is a virtual composite item). For instance, in the case of a racing game in which the item is a car, the characteristics of the car may include the power of the car, the engine size of the car, the precision of the car, and optionally the subparts of the car (when the car is a virtual composite item).

In panel 702 of FIG. 7, there are connections 708 between the icons 706 for various item characteristics. In some embodiments, connections 708 highlight the sequential order by which characteristics must be selected in order to acquire a specific item characteristic. For instance, in order to select the first instance of characteristic 706-2 or the characteristic 706-4 or the characteristic 706-6, the user must pay for the characteristic 706-1. The same characteristic can be represented multiple times in panel 702. For instance, characteristic 706-2 is listed twice (far left and far right of the screen image). Each instance of characteristic 706-2 in the panel 702 allows the user to upgrade the characteristic to a better numeric level in exchange for game credit. In some embodiments, achieving a better numeric level means increasing the numeric level of the characteristic. In some embodiments, achieving a better numeric level means decreasing the numeric level of the characteristic. In some embodiments, not all characteristic upgrades cost the same. Accordingly, in some embodiments item database 320, illustrated in FIG. 3, is used to track which items 330 are available in the game, the cost 332 of each such game, if any, the characteristics 334 of each such item and the numeric scale of each such characteristic, the default characteristic value on the numeric scale of each such characteristic, the amount of game credit that is required to advance (incrementally improve) each such characteristic by a predetermined amount on their corresponding numeric scale, and optionally, when the item is a virtual composite items, the subparts 335 of the item 330.

As illustrated in FIG. 8, not all the characteristics available for each of the items are the same. As illustrated in FIG. 8, the Scout M390 includes many of the same characteristics available for upgrade as the Defender of FIG. 7, such as upgrades 706-1, 706-5, 706-6, 706-7, and 708-8. However, the Scout M390 also includes a silencer weapon upgrade 806-1 and a scope sway intensity upgrade 806-2.

By selecting store icon 610 of FIG. 6, the user can select new items. In some embodiments, when the user selects the store icon 610, item categories (e.g., assault rifles, sniper rifles, shotguns, tesla rifles, "equipment" such as knives, etc.) are presented to the user for selection. Upon selection of an item category, the user is presented with the items of that category. Referring to FIG. 4, each of the item purchases and item upgrades made by the user is stored in the user's profile 422. Further, the user's profile 422 is updated to reflect the usage of game credit for these items and/or item upgrades. In step 406 of FIG. 4, the user embarks on one or more challenges in order to acquire game credit 406. For instance, in one example, an avatar of the user is posed against a plurality of defendants of a base in a three dimensional action shooting format in which the avatar and the plurality of defendants are adverse to each other and fire weapons at each other. In this example, the avatar has an ability to fire a weapon in three dimensions during a campaign.

Figure 9:
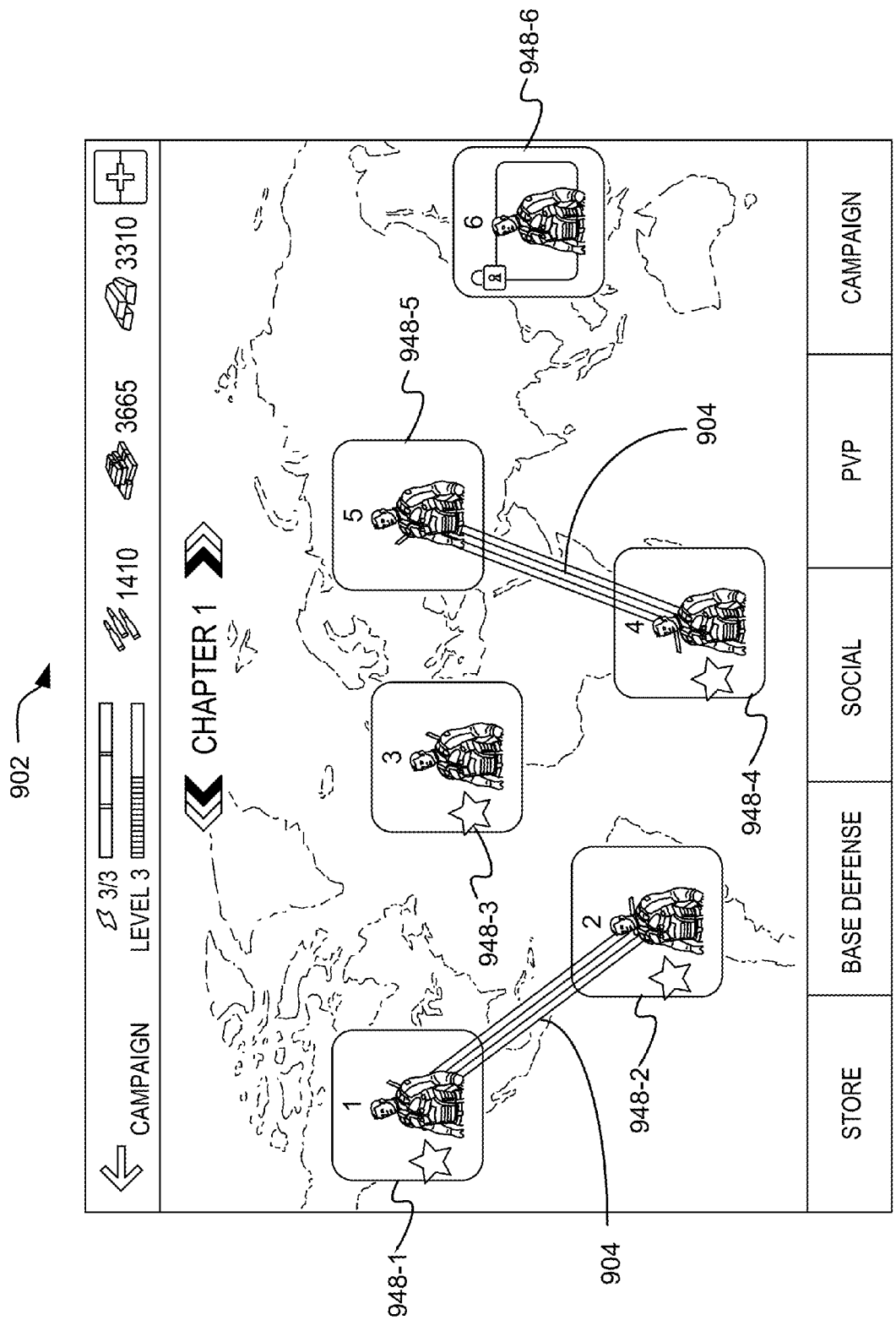
FIG. 9 is a screen image showing the challenges that are available for a user, and the order by which such challenges must be completed, in accordance with an embodiment of the present disclosure.

Referring to FIG. 6, in response to selection of the challenges button 608, a description of available challenges is provided. In some embodiments, the available challenges are stored in level database 346 on gaming server 106. FIG. 9 provides an example, in accordance with one example in accordance with the present disclosure, of challenges that are available to a user. As was the case with item upgrades in some embodiments of the present disclosure, in some embodiments there is a sequential order imposed on the challenges. That is, certain challenges must be successfully completed by the player before other challenges can be attempted. In panel 902 of FIG. 9, the sequential order of the challenges is illustrated by lines 904. For instance, they show that challenges 948-1 or 948-4 must be attempted first, after which point challenges 948-2 and 948-5 can be attempted. Once challenge 948-2 is successfully completed, a line (not shown) is drawn to challenge 984-3 on panel 902 indicating that it now may be attempted.

Figure 10:
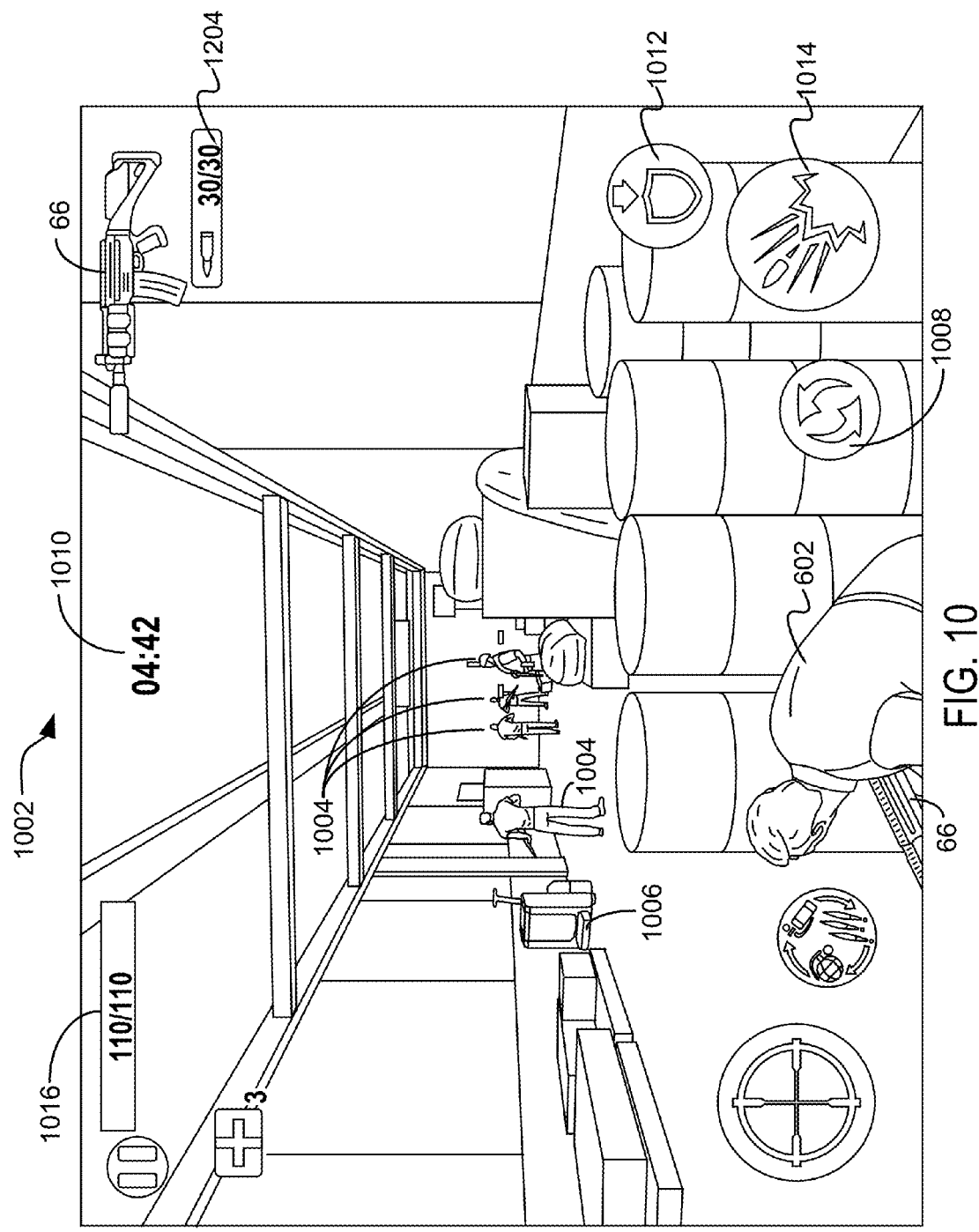
FIG. 10 is a screen image of a particular challenge, in accordance with an embodiment of the present disclosure.

As an example, selection of challenge 948-1 on panel 902 leads directly to the starting point of the challenge illustrated in FIG. 10. As such, the starting point of the challenge is considered a node in a graph in some embodiments. Here, the avatar 602 of the user is posed against a plurality of defendants 1004 of a base associated with the selected challenge in a three dimensional action shooting format in which the avatar 602 and a plurality of defendants 1004 are adverse to each other and fire weapons at each other. Specifically, the avatar 602 has been placed in a first three-dimensional pre-fabricated section of a base, in this example a warehouse that includes various barrels, boxes, crates and a forklift 1006. Advantageously, the avatar 602 has an ability to fire a weapon in three dimensions. The user controls the view of the three-dimensional section by, for example, touching the screen 26 of the user device 102 of FIG. 2, making up, down, left, or right sweep motions, or combinations thereof to view the room from any angle from the current vantage point of the avatar 602. In other embodiments, the user controls the view of the three-dimensional section by, for example, entering select keyboard commands using the optional keyboard 28 of the user device 102 of FIG. 2, thereby making up, down, left, or right motions, or combinations thereof to view the three-dimensional section from any angle from the current vantage point of the avatar 602. In still other embodiments, the user controls the view of the three-dimensional section by, for example, using an optional mouse of the user device 102 of FIG. 2, thereby making up, down, left, or right motions, or combinations thereof to view the three-dimensional section from any angle from the current vantage point of the avatar 602. In some embodiments, the user can switch weapons dynamically during a campaign by selecting option 1008, which stops the campaign clock 1010, and allows the user to select from among the items in the user's profile 48 for usage in the campaign. Each of the above examples of user directed input represent examples of instructions received from a user responsive to one or more challenges.

In some embodiments, the clock 1010 reports the amount of time left for the user to complete the challenge. For instance, in the example illustrated in FIG. 10, this represents a deadline before which the avatar 602 must neutralize the base target in order to receive game credit. If the avatar 602 neutralizes the base target before the clock 1010 counts down to zero (or counts up to some predetermined time), then the challenge is deemed successful (408). If the avatar 602 does not neutralize the base target before the clock 1010 counts down to zero (or counts up to some predetermined time) or is killed by defenders 1004, then the challenge is deemed unsuccessful (410).

Figure 5A:
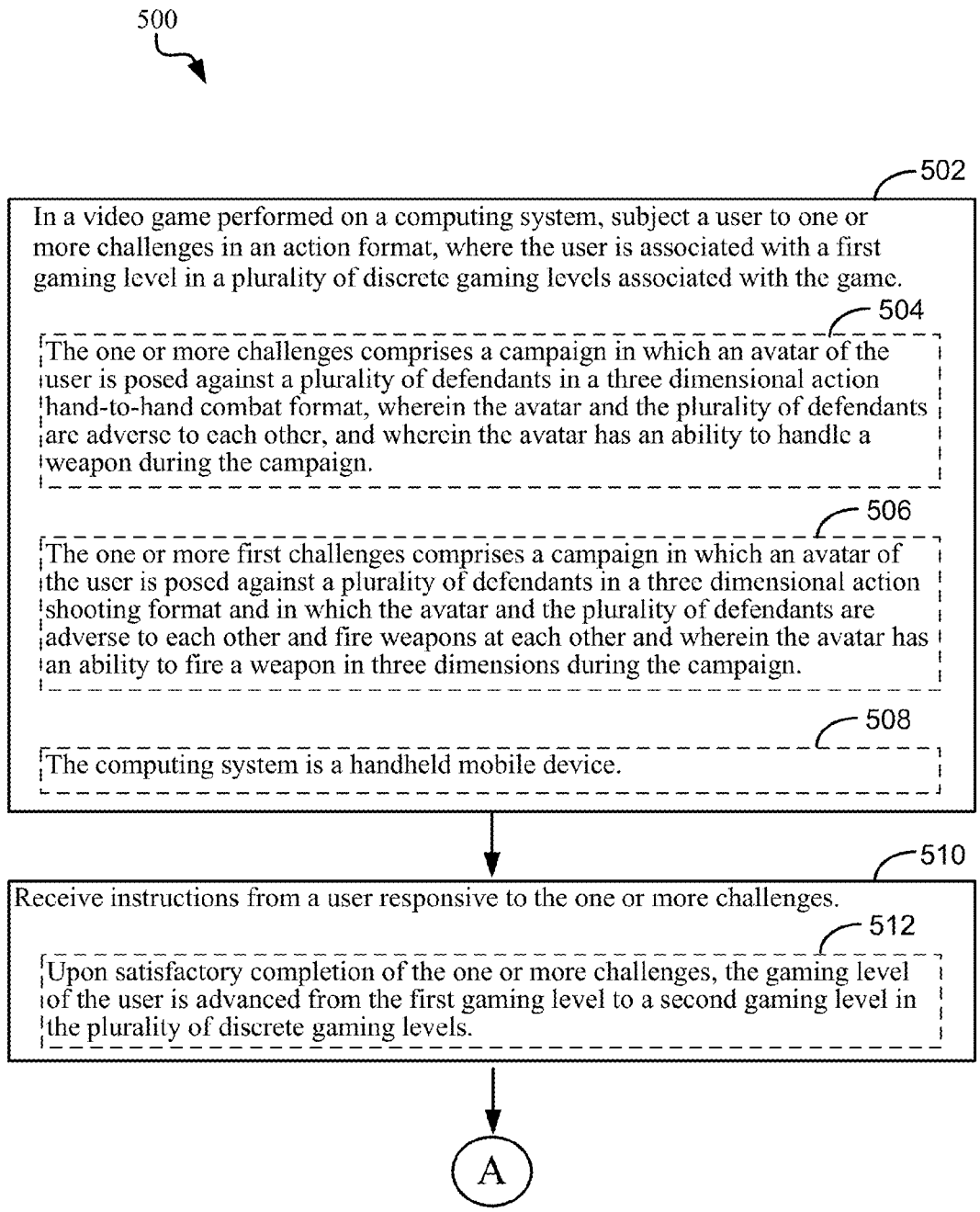
Figure 5C:
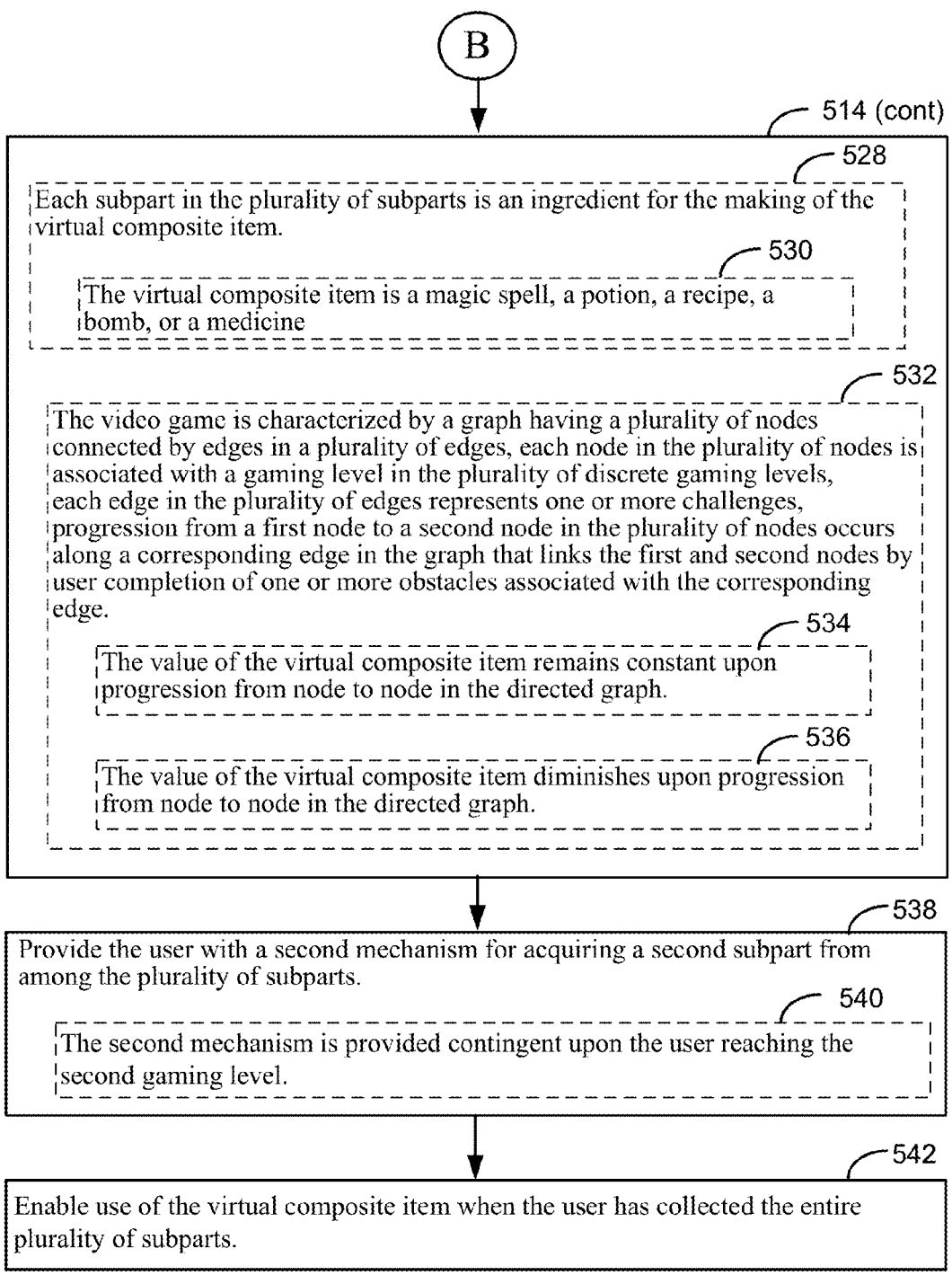

FIG. 5 is an example flow chart illustrating a method 500 in accordance with embodiments of the present disclosure in which a user plays a video game on a computing system (e.g., a handheld mobile device (508)). In the method, a user is subjected to one or more challenges in an action format, where the user is associated with a first gaming level 348 in a plurality of discrete gaming levels associated with the game 502. In typical embodiments, each successive gaming level 348 in the plurality of gaming levels is achieved by the user through successful completion of one or more challenges. Such challenges are game specific. For instance, in an action game, the challenge may be successful neutralization of an adversary. In a driving game, the challenge may be successful completion of a particular racing circuit using a specific car within a certain period of time.

In one specific embodiment, the one or more challenges comprise a campaign in which an avatar of the user is posed against a plurality of defendants in a three dimensional action hand-to-hand combat format. The avatar and the plurality of defendants are adverse to each other. In such embodiments, the avatar has an ability to handle a weapon during the campaign (504).

In another specific embodiment, the one or more challenges comprise a campaign in which an avatar of the user is posed against a plurality of defendants in a three dimensional action shooting format. The avatar and the plurality of defendants are adverse to each other and fire weapons at each other. In such embodiments, the avatar has an ability to fire a weapon in three dimensions during the campaign (506).

Referring to FIG. 5, the method continues as instructions are received from a user responsive to the one or more challenges (510). For instance, in a racing game, the instructions are control instructions over a racing car. In an action adventure game in which there is an avatar for the user, the instructions are movement instructions that instruct on the movement of the avatar, instructions on which items (e.g., weapons) associated with the user are to be used, and instructions for using such items.

In some embodiments, upon satisfactory completion of the one or more challenges, the gaming level of the user is advanced from the first gaming level to a second gaming level in the plurality of discrete gaming levels (512). In some such embodiments, when the user advances levels, the nature of the challenges the user is posed against changes. For instance, in a car racing game, the user is faced with new car racing circuits. Moreover, in some embodiments, the items that the user is able to acquire changes as the user advances to higher levels.

Figure 11:
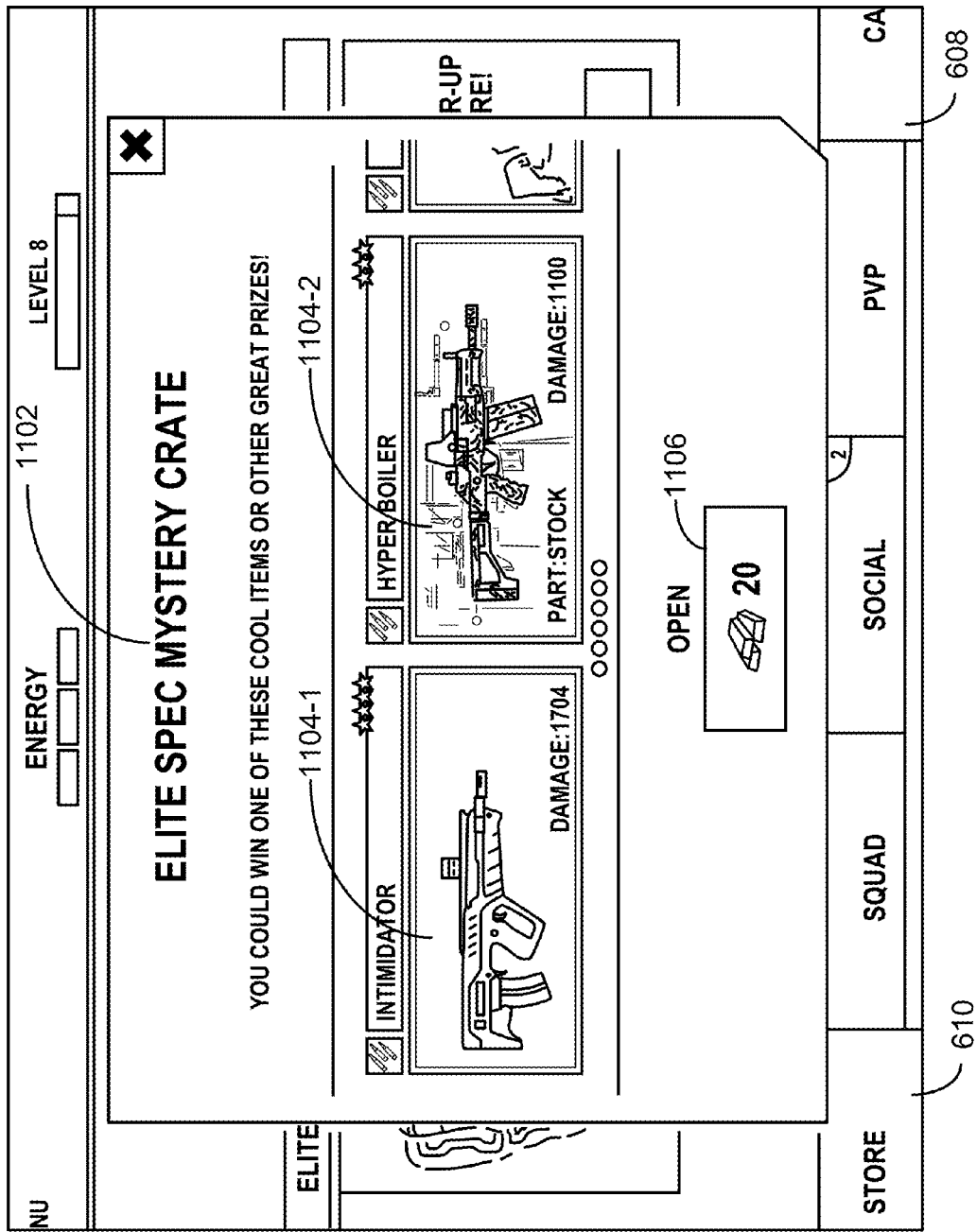
FIG. 11 is a screen image of an offer to acquire an item, in accordance with an embodiment of the present disclosure.
Figure 12:
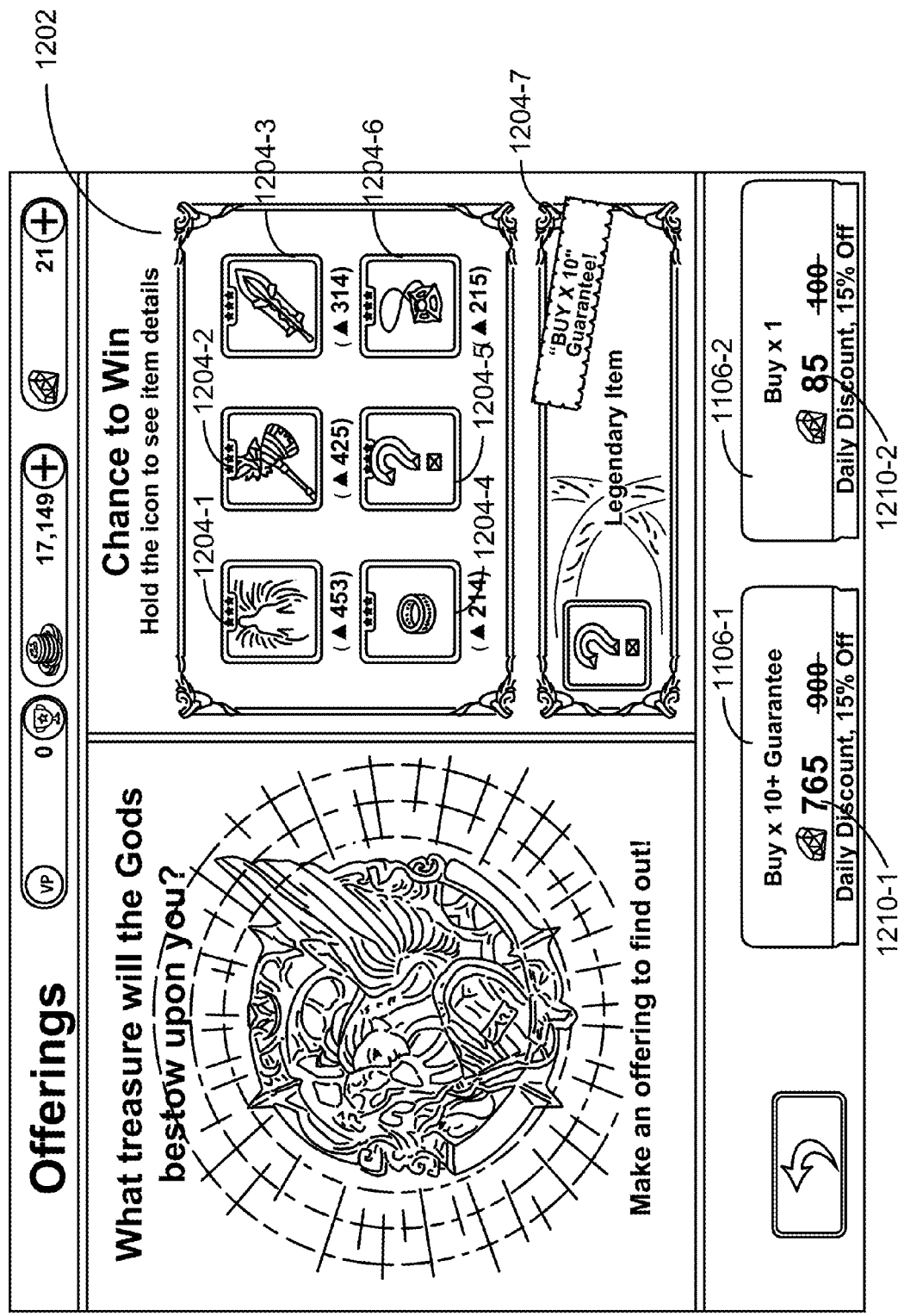
FIG. 12 is a screen image of a mystery box offering, in accordance with an embodiment of the present disclosure.

Referring to FIG. 5, the method continues as the user is provided with a first mechanism for acquiring a first subpart from among a plurality of subparts at a stage in the game in which the user has collected none of the subparts in the plurality of subparts. The subparts in the plurality of subparts collectively define a virtual composite item that has a value within the game. FIG. 11 illustrates. In FIG. 11, the user is presented with a panel 1102 presenting an opportunity to win items 1104-1 (Intimidator), 1104-2 (Hyper Boiler), etc. in a mystery box setting. The cost of this chance is presented as well as affordance 1106. FIG. 12 illustrates such a mystery box 1202.

In FIG. 12, a plurality of representations is displayed. Each respective representation 1204 in the plurality of representations corresponds to an item 330 in a plurality of items. Further, each respective item in the plurality of items has a corresponding item characteristic grade 334 in a plurality of item characteristic grades. Further, each respective item in the plurality of items is associated with a probability of being awarded that is determined, at least in part, by the characteristic grade of the respective item. At least one item in the plurality of items is a subpart of the virtual composite item. Along with the plurality of representations, a cost 1210 for the chance to win a represented item is displayed. Responsive to the user selecting an affordance 1106 that commits the user to paying the cost, the user is awarded with a single item from among the plurality of items. In FIG. 12, the cost is displayed directly on the affordance and the affordance is a toggle button. The selected single item that is awarded to the user is chosen in accordance with the probability associated with each item in the plurality of items (516). In some embodiments, the cost for the chance is payable through a first form of currency and the user acquires the first form of currency through payment of monetary funds (518). In some embodiments, the cost for the chance is payable through a first form of currency and the user acquires the first form of currency through successful completion of the one or more challenges (520).

FIG. 12 illustrates one form of mechanism for acquiring a subpart of a virtual composite item. In fact, FIG. 12 illustrates a non-guaranteed distribution mechanism, in that the user is not guaranteed to win a subpart of a virtual composite item. However, the present disclosure is not so limited and encompasses a broad range of mechanisms by which a user may acquire subparts of a virtual composite item. For instance, in some embodiments, the subparts are hidden in the game topology and the user must find the subparts. In some embodiments, the user is awarded a subpart for successful completion of a challenge. In still other embodiments, the user may purchase subparts. Moreover, these subpart distribution mechanisms are not mutually exclusive. A given video game may invoke any combination of these and other subpart distribution mechanisms.

Figure 13:
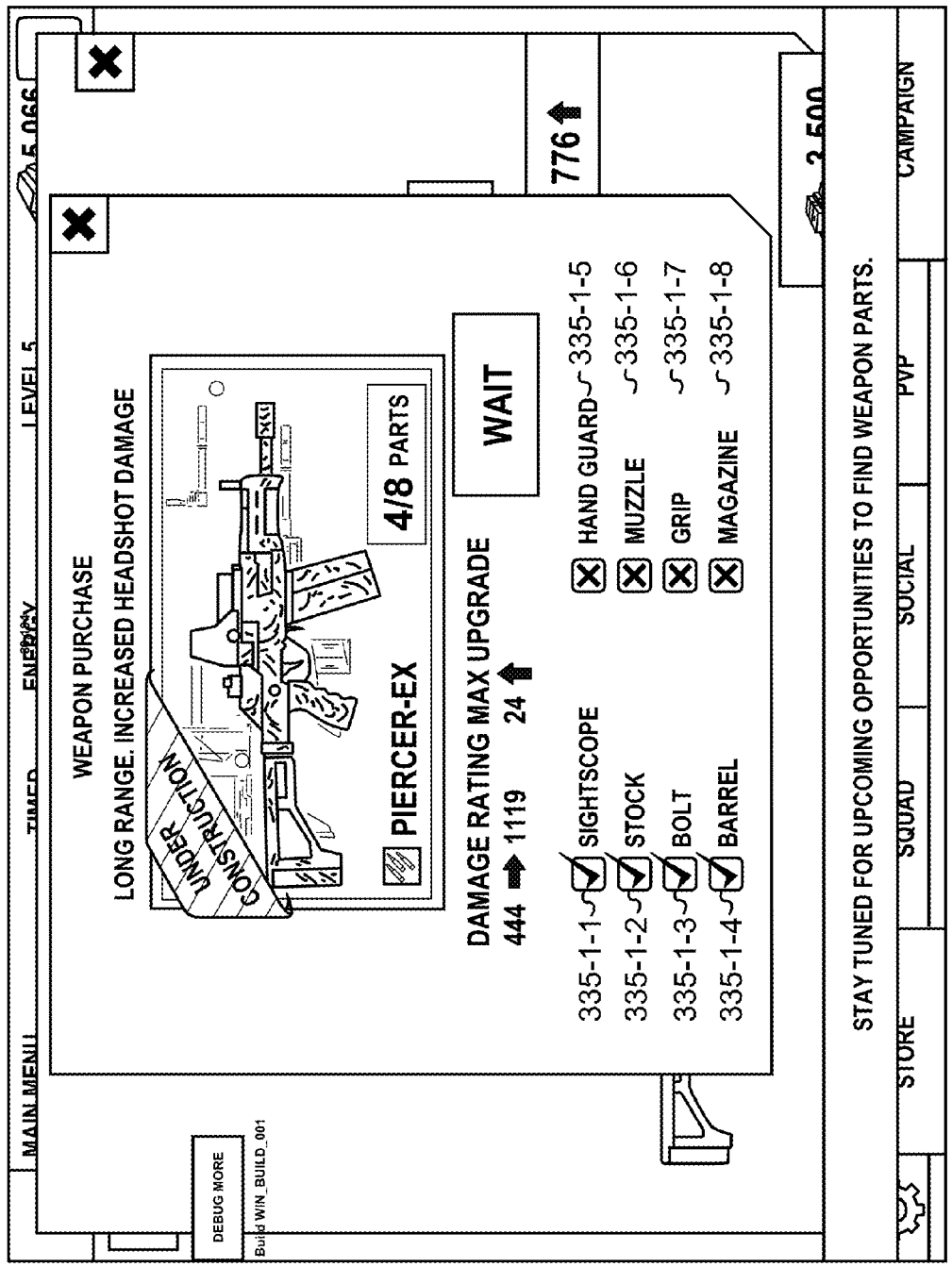
FIG. 13 is a screen image of the progress a user has made in acquiring the respective subparts in a plurality of subparts of a virtual composite item, in accordance with an embodiment of the present disclosure.

FIG. 13 illustrates a tallying of the subparts 335 in a plurality of subparts for a virtual composite item that a user has so far acquired in a video game. As illustrated in FIG. 13, the user has acquired the sightscope subpart 335-1-1, the stock subpart 335-1-2, the bolt subpart 335-1-3, the barrel subpart 335-1-4, but has not yet collected the hang guard subpart 335-1-5, the muzzle subpart 335-1-6, the grip subpart 335-1-7, or the magazine subpart 335-1-8. In some embodiments, until the user collects these four remaining subparts, the virtual composite item, here the Piercer-ex, will not have any functional utility in the video game (514).

In some embodiments, the virtual composite item is a weapon, a tool, a potion, a user progression upgrade, a user health status upgrade, or a user power status upgrade (522). In some embodiments, each subpart in the plurality of subparts is a portion of the blueprints for the making the virtual composite item 524, such as a defensive base, an offensive base, a weapon, or a car (526). In some embodiments, each subpart in the plurality of subparts is an ingredient for the making the virtual composite item (528), such as magic spell, a potion, a recipe, a bomb, or a medicine (530).

Referring to FIG. 9, in some embodiments, the video game is characterized by a graph having a plurality of nodes 948 connected by edges 904 in a plurality of edges, each node in the plurality of nodes is associated with a gaming level in the plurality of discrete gaming levels, each edge in the plurality of edges represents one or more challenges, progression from a first node to a second node in the plurality of nodes occurs along a corresponding edge in the graph that links the first and second nodes by user completion of one or more obstacles associated with the corresponding edge (532). In some such embodiments, the value of the virtual composite item remains constant upon progression from node to node in the directed graph (534). For instance, consider the case in which the virtual composite item is a weapon. In such embodiments where the of the virtual composite item remains constant upon progression from node to node in the directed graph, the weapon remains effective as the user progress from node to node in the graph, and therefore, remains effective as the user faces more difficult challenges in more difficult levels. In some alternative embodiments, the value of the virtual composite item diminishes upon progression from node to node in the directed graph (536). In such embodiments where the of the virtual composite item diminishes upon progression from node to node in the directed graph, the weapon loses its effectiveness as the user progress from node to node in the graph, and therefore, is not effective as the user faces more difficult challenges in more difficult levels. This forces the user to acquire new items. In some games, the value of some items or virtual composite items remains constant across the plurality of levels of the game whereas the value of other items or virtual items various across the plurality of levels of the game.

Referring to FIG. 5, the method continues by providing the user with a second mechanism for acquiring a second subpart from among the plurality of subparts (538). In some embodiments, the second mechanism is provided contingent upon the user reaching the second gaming level (540). In some embodiments, the first mechanism is the same as the second mechanism. In some embodiments, the first mechanism is different than the second mechanism. Use of the virtual composite item is enabled when the user has collected the entire plurality of subparts (542).

Throughout this disclosure the terms profile 48 and profile 338 have been used interchangeably. While a profile 48 is found on a computing device 102 associated with a particular user and a profile 338 is found in a user profile database 336 on a gaming server 106, the present disclosure encompasses all possible variants of such a schema, including embodiments in which profile 48 does not exist or profile 338 does not exist and including embodiments in which some user information is found in profile 48 and some user information is found in profile 338. It is for this reason that the terms profile 48 and profile 338 have been used interchangeably in the present disclosure. Likewise, the terms "player" and "user" have been used interchangeably throughout the present disclosure.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the implementation(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the implementation(s).

It will also be understood that, although the terms "first," "second," etc. may be used herein to describe various elements, these elements should not be limited by these terms. These terms are only used to distinguish one element from another. For example, a first mark could be termed a second mark, and, similarly, a second mark could be termed a first mark, without changing the meaning of the description, so long as all occurrences of the "first mark" are renamed consistently and all occurrences of the "second mark" are renamed consistently. The first mark, and the second mark are both marks, but they are not the same mark.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

The foregoing description included example systems, methods, techniques, instruction sequences, and computing machine program products that embody illustrative implementations. For purposes of explanation, numerous specific details were set forth in order to provide an understanding of various implementations of the inventive subject matter. It will be evident, however, to those skilled in the art that implementations of the inventive subject matter may be practiced without these specific details. In general, well-known instruction instances, protocols, structures and techniques have not been shown in detail.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

We claim:

1. A computing system for playing a video game, the computing system comprising one or more processors and memory storing one or more programs for execution by the one or more processors, the one or more programs singularly or collectively executing a method comprising:
   (A) subjecting a user to one or more challenges in an action format in a first gaming level retrieved from a game level database, wherein an identity of the first game level is obtained from a profile associated with the user retrieved from a user profile database stored in the memory, wherein the game level database is stored in the memory and comprises a plurality of discrete gaming levels associated with the video game, wherein a level of difficulty of each gaming level is different;
   (B) receiving instructions from the user responsive to the one or more challenges;
   (C) providing the user with a first mechanism for acquiring a first subpart from among a plurality of subparts at a stage in the video game in which the user has collected none of the subparts in the plurality of subparts, wherein
      the subparts in the plurality of subparts collectively define a virtual composite item that has a value within the video game,
      the subparts do not have functionality within the video game until the user has collected the entire plurality of subparts, and
      the first mechanism is a chance to acquire the first subpart by:
         (i) displaying a plurality of representations, each respective representation in the plurality of representations corresponding to an item in a plurality of items stored in an item database in the memory, wherein each respective item in the plurality of items has a corresponding item characteristic grade in a plurality of item characteristic grades, and wherein each respective item in the plurality of items is associated with a probability of being awarded that is determined, at least in part, by the characteristic grade of the respective item, and wherein at least one item in the plurality of items is the first subpart and at least one item in the plurality of items is not the first subpart,
         (ii) displaying a cost for the chance, and
         (iii) responsive to the user selecting an affordance that commits the user to paying the cost, awarding the user with a single item from among the plurality of items, wherein the selected single item that is awarded to the user is chosen in accordance with the probability associated with each item in the plurality of items;
   (D) subsequent to the providing (C), providing the user with a second mechanism for acquiring a second subpart from among the plurality of subparts; and
   (E) enabling use of the virtual composite item when the user has collected the entire plurality of subparts and is in the profile associated with the user.

2. The computing system of claim 1, wherein the cost for the chance is payable through a first form of currency, and wherein the user acquires the first form of currency through payment of monetary funds.

3. The computing system of claim 1, wherein the cost for the chance is payable through a first form of currency, wherein the user acquires the first form of currency through successful completion of the one or more challenges.

4. The computing system of claim 1, wherein each subpart in the plurality of subparts is a portion of blueprints for the making the virtual composite item.

5. The computing system of claim 4, wherein the virtual composite item is a defensive base, an offensive base, a weapon, or a car.

6. The computing system of claim 1, wherein each subpart in the plurality of subparts is an ingredient for the making of the virtual composite item.

7. The computing system of claim 6, wherein the virtual composite item is a potion.

8. The computing system of claim 1, wherein upon satisfactory completion of the one or more challenges, the gaming level of the user is advanced from the first gaming level to a second gaming level in the plurality of discrete gaming levels.

9. The computing system of claim 8, wherein the providing (D) is executed contingent upon the user reaching the second gaming level.

10. The computing system of claim 1, wherein the virtual composite item is a weapon, a tool, a potion, a user progression upgrade, a user health status upgrade, or a user power status upgrade.

11. The computing system of claim 1, wherein
    the video game is characterized by a graph having a plurality of nodes connected by edges in a plurality of edges,
    each node in the plurality of nodes is associated with a gaming level in the plurality of discrete gaming levels, each edge in the plurality of edges represents one or more obstacles, progression from a first node to a second node in the plurality of nodes occurs along a corresponding edge in the graph that links the first and second nodes by user completion of one or more obstacles associated with the corresponding edge, wherein a level of difficulty of the completion of the one or more obstacles is associated with the level of difficulty of the gaming level of the first node associated with the corresponding edge and wherein a clock is displayed that is continuously updated to report an amount of time left for the user to complete the one or more obstacles, and the value of the virtual composite item remains constant upon progression from node to node in the directed graph.

12. The computing system of claim 1, wherein the video game is characterized by a graph having a plurality of nodes connected by edges in a plurality of edges, each node in the plurality of nodes is associated with a gaming level in the plurality of discrete gaming levels, each edge in the plurality of edges represents one or more obstacles, advancement from a first node to a second node in the plurality of nodes occurs along a corresponding edge in the graph that links the first and second nodes by user completion of one or more obstacles associated with the corresponding edge, wherein a level of difficulty of the completion of the one or more obstacles is associated with the level of difficulty of the gaming level of the first node associated with the corresponding edge and wherein a clock is displayed that is continuously updated to report an amount of time left for the user to complete the one or more obstacles, and the value of the virtual composite item diminishes upon progression from node to node in the directed graph.

13. The computing system of claim 1, wherein the one or more challenges comprises a campaign in which an avatar of the user is posed against a plurality of defendants in a three dimensional action hand-to-hand combat format, wherein the avatar and the plurality of defendants are adverse to each other, and wherein the avatar has an ability to handle a weapon during the campaign.

14. The computing system of claim 1, wherein the one or more challenges comprises a campaign in which an avatar of the user is posed against a plurality of defendants in a three dimensional action shooting format and in which the avatar and the plurality of defendants are adverse to each other and fire weapons at each other and wherein the avatar has an ability to fire a weapon in three dimensions during the campaign.

15. The computing system of claim 1, wherein the computing system is a handheld mobile device.

16. A non-transitory computer readable storage medium comprising instructions for execution by one or more processors to perform a method of playing a video game, the method comprising:

(A) subjecting a user to one or more challenges in an action format in a first gaming level retrieved from a game level database, wherein an identity of the first game level is obtained from a profile associated with the user retrieved from a user profile database stored in the non-transitory computer readable storage medium, wherein the game level database is stored in the non-transitory computer readable storage medium and comprises a plurality of discrete gaming levels associated with the video game, wherein a level of difficulty of each gaming level is different;

(B) receiving instructions from the user responsive to the one or more challenges;

(C) providing the user with a first mechanism for acquiring a first subpart from among a plurality of subparts at a stage in the video game in which the user has collected none of the subparts in the plurality of subparts, wherein the subparts in the plurality of subparts collectively define a virtual composite item that has a value within the video game, the subparts do not have functionality within the video game until the user has collected the entire plurality of subparts, and the first mechanism is a chance to acquire the first subpart by:

(i) displaying a plurality of representations, each respective representation in the plurality of representations corresponding to an item in a plurality of items stored in an item database in the non-transitory computer readable storage medium, wherein each respective item in the plurality of items has a corresponding item characteristic grade in a plurality of item characteristic grades, and wherein each respective item in the plurality of items is associated with a probability of being awarded that is determined, at least in part, by the characteristic grade of the respective item, and wherein at least one item in the plurality of items is the first subpart and at least one item in the plurality of items is not the first subpart, (ii) displaying a cost for the chance, and (iii) responsive to the user selecting an affordance that commits the user to paying the cost, awarding the user with a single item from among the plurality of items, wherein the selected single item that is awarded to the user is chosen in accordance with the probability associated with each item in the plurality of items;

(D) subsequent to the providing (C), providing the user with a second mechanism for acquiring a second subpart from among the plurality of subparts; and (E) enabling use of the virtual composite item when the user has collected the entire plurality of subparts and is in the profile associated with the user.

17. The non-transitory computer readable storage medium of claim 16, wherein each subpart in the plurality of subparts is a portion of blueprints for the making the virtual composite item.

18. The non-transitory computer readable storage medium of claim 17, wherein the virtual composite item is a defensive base, an offensive base, a weapon, or a car.

19. The non-transitory computer readable storage medium of claim 16, wherein each subpart in the plurality of subparts is an ingredient for the making the virtual composite item.

20. The non-transitory computer readable storage medium of claim 19, wherein the virtual composite item is a potion.

21. The non-transitory computer readable storage medium of claim 16, wherein upon satisfactory completion of the one or more challenges, the gaming level of the user is advanced from the first gaming level to a second gaming level in the plurality of discrete gaming levels.

22. The non-transitory computer readable storage medium of claim 21, wherein the providing (D) is executed contingent upon the user reaching the second gaming level.

23. The non-transitory computer readable storage medium of claim 16, wherein the virtual composite item is a weapon, a tool, a potion, a user progression upgrade, a user health status upgrade, or a user power status upgrade.

24. The non-transitory computer readable storage medium of claim 16, wherein
the game is characterized by a graph having a plurality of nodes connected by edges in a plurality of edges,
each node in the plurality of nodes is associated with a gaming level in the plurality of discrete gaming levels,
each edge in the plurality of edges represents one or more obstacles,
progression from a first node to a second node in the plurality of nodes occurs along a corresponding edge in the graph that links the first and second nodes by user completion of one or more obstacles associated with the corresponding edge, wherein a level of difficulty of the completion of the one or more obstacles is associated with the level of difficulty of the gaming level of the first node associated with the corresponding edge and wherein a clock is displayed that is continuously updated to report an amount of time left for the user to complete the one or more obstacles, and
the value of the virtual composite item remains constant upon progression from node to node in the directed graph.

25. The non-transitory computer readable storage medium of claim 16, wherein
the game is characterized by a graph having a plurality of nodes connected by edges in a plurality of edges,
each node in the plurality of nodes is associated with a gaming level in the plurality of discrete gaming levels,
each edge in the plurality of edges represents one or more challenges,
progression from a first node to a second node in the plurality of nodes occurs along a corresponding edge in the graph that links the first and second nodes by user completion of one or more obstacles associated with the corresponding edge, wherein a level of difficulty of the completion of the one or more obstacles is associated with the level of difficulty of the gaming level of the first node associated with the corresponding edge and wherein a clock is displayed that is continuously updated to report an amount of time left for the user to complete the one or more obstacles, and
the value of the virtual composite item diminishes upon progression from node to node in the directed graph.

26. A method for playing a video game comprising:
at a computer system having processors and a memory:
(A) subjecting a user to one or more challenges in an action format in a first gaming level retrieved from a game level database, wherein an identity of the first game level is obtained from a profile associated with the user retrieved from a user profile database stored in the memory, wherein the game level database is stored in the memory and comprises a plurality of discrete gaming levels associated with the video game, wherein a level of difficulty of each gaming level is different;
(B) receiving instructions from the user responsive to the one or more challenges;
(C) providing the user with a first mechanism for acquiring a first subpart from among a plurality of subparts at a stage in the video game in which the user has collected none of the subparts in the plurality of subparts, wherein
the subparts in the plurality of subparts collectively define a virtual composite item that has a value within the video game,
the subparts do not have functionality within the video game until the user has collected the entire plurality of subparts, and
the first mechanism is a chance to acquire the first subpart by:
(i) displaying a plurality of representations, each respective representation in the plurality of representations corresponding to an item in a plurality of items stored in an item database in the memory, wherein each respective item in the plurality of items has a corresponding item characteristic grade in a plurality of item characteristic grades, and wherein each respective item in the plurality of items is associated with a probability of being awarded that is determined, at least in part, by the characteristic grade of the respective item, and wherein at least one item in the plurality of items is the first subpart and at least one item in the plurality of items is not the first subpart,
(ii) displaying a cost for the chance, and
(iii) responsive to the user selecting an affordance that commits the user to paying the cost, awarding the user with a single item from among the plurality of items, wherein the selected single item that is awarded to the user is chosen in accordance with the probability associated with each item in the plurality of items;
(D) subsequent the providing (C), providing the user with a second mechanism for acquiring a second subpart from among the plurality of subparts; and
(E) enabling use of the virtual composite item when the user has collected the entire plurality of subparts and is in the profile associated with the user.

27. The method of claim 26, wherein
the game is characterized by a graph having a plurality of nodes connected by edges in a plurality of edges,
each node in the plurality of nodes is associated with a gaming level in the plurality of discrete gaming levels,
each edge in the plurality of edges represents one or more obstacles,
progression from a first node to a second node in the plurality of nodes occurs along a corresponding edge in the graph that links the first and second nodes by completing one or more obstacles associated with the corresponding edge, wherein a level of difficulty of the completion of the one or more obstacles is associated with the level of difficulty of the gaming level of the first node associated with the corresponding edge and wherein a clock is displayed that is continuously updated to report an amount of time left for the user to complete the one or more obstacles, and
the value of the virtual composite item remains constant upon progression from node to node in the directed graph.

28. The method of claim 26, wherein
the game is characterized by a graph having a plurality of nodes connected by edges in a plurality of edges,
each node in the plurality of nodes is associated with a gaming level in the plurality of discrete gaming levels,
each edge in the plurality of edges represents one or more obstacles,
progression from a first node to a second node in the plurality of nodes occurs along a corresponding edge in the graph that links the first and second nodes by user completion of one or more challenges associated with the corresponding edge, wherein a level of difficulty of the completion of the one or more obstacles is associated with the level of difficulty of the gaming level of the first node associated with the corresponding edge and wherein a clock is displayed that is continuously updated to report an amount of time left for the user to complete the one or more obstacles, and the value of the virtual composite item diminishes upon progression from node to node in the directed graph.

29. The computing system of claim 6, wherein the virtual composite item is a magic spell.

30. The non-transitory computer readable storage medium of claim 19, wherein the virtual composite item is a magic spell.

* * * * *